US012663617B2

(12) United States Patent
Rudnick et al.

(10) Patent No.: US 12,663,617 B2
(45) Date of Patent: Jun. 23, 2026

(54) FOLDED CAMERA LENS DESIGNS

(71) Applicant: Corephotonics Ltd., Tel Aviv (IL)

(72) Inventors: Roy Rudnick, Tel Aviv (IL); Michael Dror, Tel Aviv (IL); Ephraim Goldenberg, Tel Aviv (IL); Gal Shabtay, Tel Aviv (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/786,504

(22) Filed: Jul. 28, 2024

(65) Prior Publication Data

US 2026/0029623 A1      Jan. 29, 2026

Related U.S. Application Data

(63) Continuation of application No. 16/604,009, filed as application No. PCT/IB2019/053662 on May 4, 2019, now Pat. No. 12,078,868.
(Continued)

(51) Int. Cl.
*G02B 13/00* (2006.01)

(52) U.S. Cl.
CPC ................................ *G02B 13/0065* (2013.01)

(58) Field of Classification Search
CPC ... G02B 9/34; G02B 9/60; G02B 9/62; G02B 9/64; G02B 13/004; G02B 13/0045;
(Continued)

(56) References Cited

U.S. PATENT DOCUMENTS 2,106,752 A      2/1938   Land
2,354,503 A      7/1944   Arthur
(Continued)

FOREIGN PATENT DOCUMENTS

CN      101634738 A      1/2010
CN      102147519 A      8/2011
(Continued)

OTHER PUBLICATIONS

Office Action in related EP patent application 19773329.8, dated May 19, 2025.
(Continued)

*Primary Examiner* — Joseph P Martinez
(74) *Attorney, Agent, or Firm* — Nathan & Associates Patent Agents Ltd.; Menachem Nathan

(57)      ABSTRACT

Folded lens modules and assemblies characterized by low height and large entrance pupil (clear aperture), designed for folded cameras in consumer electronics and specifically in mobile phones. In some embodiments, a folded lens assembly comprises a plurality of lens elements that include, in order for an object side to an image side, a first lens element $L_1$ with a clear aperture $CA(S_1)$ and a second lens element $L_2$ with a clear aperture $CA(S_3)$, wherein $CA(S_1)/CA(S_3)$ >1.2 and wherein the lens assembly has a ratio between an image sensor diagonal length SDL and a clear aperture of a last lens element surface $CA(S_{2N})$, $SDL/CA(S_{2N})$>1.5.

21 Claims, 16 Drawing Sheets

Related U.S. Application Data

(60) Provisional application No. 62/755,726, filed on Nov. 5, 2018, provisional application No. 62/671,086, filed on May 14, 2018.

(58) Field of Classification Search
CPC .. G02B 13/009; G02B 15/144; G02B 15/145; G02B 15/146
See application file for complete search history.

(56) References Cited

U.S. PATENT DOCUMENTS

| | | | |
|---|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay et al. |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,869,846 B1 | 1/2018 | Bone et al. |
| 2002/0118471 A1 | 8/2002 | Imoto |
| 2003/0048542 A1 | 3/2003 | Enomoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0275025 A1 | 12/2006 | Labaziewicz et al. |
| 2007/0114990 A1 | 5/2007 | Godkin |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |

(56)                References Cited

U.S. PATENT DOCUMENTS

| | | |
|---|---|---|
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2017/0353645 A1 | 12/2017 | Ltd |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |

| | | | |
|---|---|---|---|
| 2019/0170965 A1 | 6/2019 | Shabtay et al. | |
| 2019/0187443 A1 | 6/2019 | Jia et al. | |
| 2019/0187486 A1 | 6/2019 | Goldenberg et al. | |
| 2019/0196148 A1 | 6/2019 | Yao et al. | |
| 2019/0215440 A1 | 7/2019 | Rivard et al. | |
| 2019/0222758 A1 | 7/2019 | Goldenberg et al. | |
| 2019/0235202 A1 | 8/2019 | Smyth et al. | |
| 2019/0353874 A1 | 11/2019 | Yeh et al. | |
| 2020/0084358 A1 | 3/2020 | Nadamoto | |
| 2020/0192069 A1 | 6/2020 | Makeev et al. | |
| 2020/0221026 A1 | 7/2020 | Fridman et al. | |
| 2020/0241233 A1 | 7/2020 | Shabtay et al. | |
| 2020/0333691 A1 | 10/2020 | Shabtay et al. | |
| 2020/0400926 A1 | 12/2020 | Bachar | |
| 2021/0048628 A1 | 2/2021 | Shabtay et al. | |
| 2021/0048649 A1 | 2/2021 | Goldenberg et al. | |
| 2021/0165192 A1 | 6/2021 | Goldenberg et al. | |
| 2021/0263276 A1 | 8/2021 | Huang et al. | |
| 2021/0333692 A1* | 10/2021 | Rudnick | G02B 9/38 |
| 2021/0364746 A1 | 11/2021 | Chen | |
| 2021/0396974 A1 | 12/2021 | Kuo | |
| 2022/0046151 A1 | 2/2022 | Shabtay et al. | |
| 2022/0066168 A1 | 3/2022 | Shi | |
| 2022/0113511 A1 | 4/2022 | Chen | |
| 2022/0206264 A1 | 6/2022 | Rudnick et al. | |
| 2022/0232167 A1 | 7/2022 | Shabtay et al. | |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 2000131610 A | 5/2000 |
| JP | 2000292848 A | 10/2000 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20080088477 A | 10/2008 |

(56)         References Cited

FOREIGN PATENT DOCUMENTS

| | | |
|---|---|---|
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | 201819974 A | 6/2018 |
| TW | M602642 U | 10/2020 |
| WO | 2013058111 A1 | 4/2013 |
| WO | 2013063097 A1 | 5/2013 |
| WO | 2018130898 A1 | 7/2018 |
| WO | 2018154421 A1 | 8/2018 |

OTHER PUBLICATIONS

A compact and cost effective design for cell phone zoom lens, Chang et al., Sep. 2007, 8 pages.

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

Office Action in related TW Application 113126623 dated Jan. 28, 2026.

Office Action in related EP application 19773329.8, dated Mar. 6, 2026.

* cited by examiner

<u>100</u>

<u>100</u>

_170_

_170_

FOLDED CAMERA LENS DESIGNS

CROSS REFERENCE TO RELATED APPLICATIONS

This application is a continuation of U.S. patent application Ser. No. 16/604,009 filed Oct. 9, 2019 (now allowed), which was a 371 National Phase application from international application PCT/IB2019/053662 filed May 4, 2019 and claims the benefit of priority from U.S. Provisional patent applications No. 62/671,086 filed May 14, 2018 and 62/755,726 filed Nov. 5, 2018, both of which are incorporated herein by reference in their entirety.

TECHNICAL FIELD

The presently disclosed subject matter is generally related to the field of digital cameras.

BACKGROUND

Dual-aperture zoom cameras (also referred to as dual-cameras), in which one camera (also referred to as "sub-camera") has a Wide FOV ("Wide sub-camera") and the other has a narrow FOV ("Tele sub-camera"), are known.

International patent publication WO 2016/024192, which is incorporated herein by reference in its entirety, discloses a "folded camera module" (also referred to simply as "folded camera") that reduces the height of a compact camera. In the folded camera, an optical path folding element (referred to hereinafter as "OPFE") e.g. a prism or a mirror (otherwise referred to herein collectively as "reflecting element") is added in order to tilt the light propagation direction from perpendicular to the smart-phone back surface to parallel to the smart-phone back surface. If the folded camera is part of a dual-aperture camera, this provides a folded optical path through one lens assembly (e.g. a Tele lens). Such a camera is referred to herein as "folded-lens dual-aperture camera". In general, the folded camera may be included in a multi-aperture camera, for example together with two "non-folded" (upright) camera modules in a triple-aperture camera.

SUMMARY

A small height of a folded camera is important to allow a host device (e.g. a smartphone, tablets, laptops or smart TV) that includes it to be as thin as possible. The height of the camera is often limited by the industrial design. In contrast, increasing the optical aperture of the lens results in an increase in the amount of light arriving at the image sensor and improves the optical properties of the camera.

Therefore, there is a need for, and it would be advantageous to have a folded camera in which the height of the lens optical aperture is maximal for a given camera height and/or for a lens module height.

In exemplary embodiments, there are provided high optical performance lenses (or "lens assemblies") with a large front clear aperture (CA), a large first surface CA and relatively small clear apertures for all other lens elements. The lens elements are listed in order from an object side (first lens element $L_1$) to an image side (last lens element $L_i$). In each embodiment, the last lens element clear aperture is smaller than the diagonal length of an image sensor (also referred to herein as "sensor diagonal length" or "SDL") included with the lens in a digital camera. In the following Tables, all dimensions are given in millimeters. All terms and acronyms have their ordinary meaning as known in the art.

In some embodiments, there are provided folded lens assemblies for a folded camera, comprising: a plurality of lens elements that include, in order for an object side to an image side, a first lens element $L_1$ with a clear aperture $CA(S_1)$ and a second lens element $L_2$ with a clear aperture $CA(S_3)$, wherein $CA(S_1)/CA(S_3)>1.2$ and wherein the lens assembly has a ratio between an image sensor diagonal length SDL and a clear aperture of a last lens element surface $CA(SN)$, $SDL/CA(S_2N)>1.5$.

In some embodiments, the first lens element has positive refractive power and the second lens element has negative refractive power, and the plurality of lens elements further includes a third lens element with positive refractive power and a fourth lens element with negative refractive power.

In some embodiments, the first lens element has positive refractive power and the second lens element has negative refractive power, and the plurality of lens elements further includes a third lens element with positive refractive power and a fourth lens element with positive refractive power.

In some embodiments, the first lens element has positive refractive power and the second lens element has negative refractive power, and the plurality of lens elements further includes a third lens element with negative refractive power and a fourth lens element with positive refractive power.

In some embodiments, the plurality of lens elements further includes a fifth lens element with negative refractive power.

In some embodiments, the lens assembly has a total track length (TTL) and a back focal length (BFL) with a ratio $BFL/TTL>0.35$.

In some embodiments, an optical window is positioned in a path defining the BFL and the TTL.

In some embodiments, there are provided folded lens assemblies for a folded camera, comprising: a plurality N of lens elements that include, in order for an object side to an image side, a first lens element $L_1$ with a clear aperture $CA(S_1)$, wherein all clear apertures of all other lens elements $L_2$ to $L_N$ of the plurality N of lens elements are no larger than $CA(S_1)$, wherein the folded camera includes an image sensor having a sensor diagonal length SDL and wherein $CA(S_1)<SDL<1.5\times CA(S_1)$.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, May also be provided separately or in any suitable sub-combination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Figure 1A:
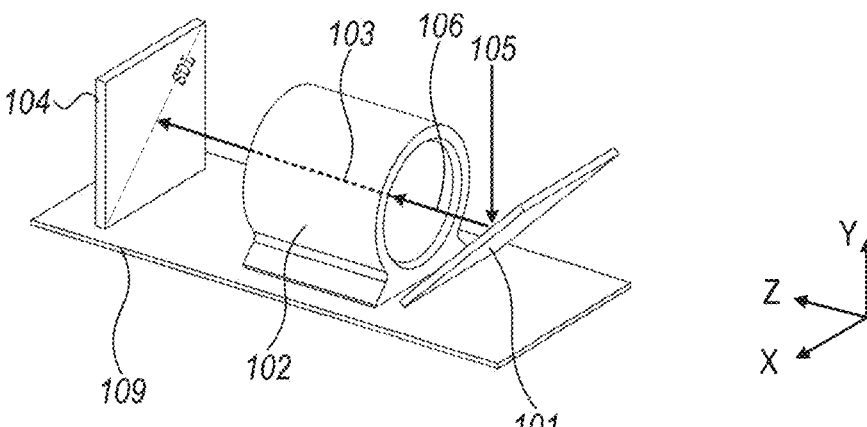
FIG. 1A is a general isometric view of an example of a known folded camera.
Figure 1B:
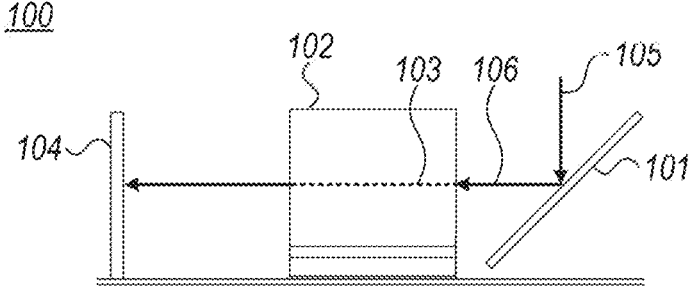
FIG. 1B is a side view of the camera of FIG. 1A.

FIGS. 1A and 1B illustrate a digital folded camera 100, which may operate for example as a Tele camera. Digital camera 100 comprises a first reflecting element (e.g. mirror or prism, and also referred to sometimes as "optical path folding element" (OPFE)) 101, a plurality of lens elements (not visible in this representation, but visible e.g. in FIGS. 2A and 2B) and an image sensor 104. The lens elements (and also barrel, the optical lens module) may have axial symmetric along a first optical axis 103. At least some of the lens elements can be held by a structure called a "barrel" 102. An optical lens module comprises the lens elements and the barrel. The barrel can have a longitudinal symmetry along optical axis 103. In FIGS. 1A to 1D, the cross-section of this barrel is circular. This is, however, not mandatory and other shapes can be used.

The path of the optical rays from an object (not shown) to image sensor 104 defines an optical path (see optical paths 105 and 106, which represent portions of the optical path).

OPFE 101 may be a prism or a mirror. As shown in FIG. 1A, OPFE 101 can be a mirror inclined with respect to optical axis 103. In other cases (not shown, see for example PCT/IB2017/052383), OPFE 101 can be a prism with a back surface inclined with respect to optical axis 103. OPFE folds the optical path from a first optical path 105 to a second optical path 106. Optical path 106 is substantially parallel to the optical axis 103. The optical path is thus referred to as "folded optical path" (indicated by optical paths 105 and 106) and camera 100 is referred to as "folded camera".

In particular, in some examples, OPFE 101 can be inclined at substantially 45° with respect to optical axis 103. In FIG. 1A, OPFE 101 is also inclined at substantially 45° with respect to optical path 105.

In some known examples, image sensor 104 lies in a X-Y plane substantially perpendicular to optical axis 103. This is however not limiting and the image sensor 104 can have a different orientation. For example, and as described in WO 2016/024192, image sensor 104 can be in the XZ plane. In this case, an additional OPFE can be used to reflect the optical rays towards image sensor 104.

According to some examples, image sensor 104 has a rectangular shape. According to some examples, image sensor 104 has a circular shape. These examples are however not limiting.

In various examples camera 100 may be mounted on a substrate 109, e.g. a printed circuit board (PCB), as known in the art.

Two sub-cameras, for example a Wide sub-camera 130 and a Tele sub-camera 100 may be included in a digital camera 170 (also referred to as dual-camera or dual-aperture camera).

Figure 1C:
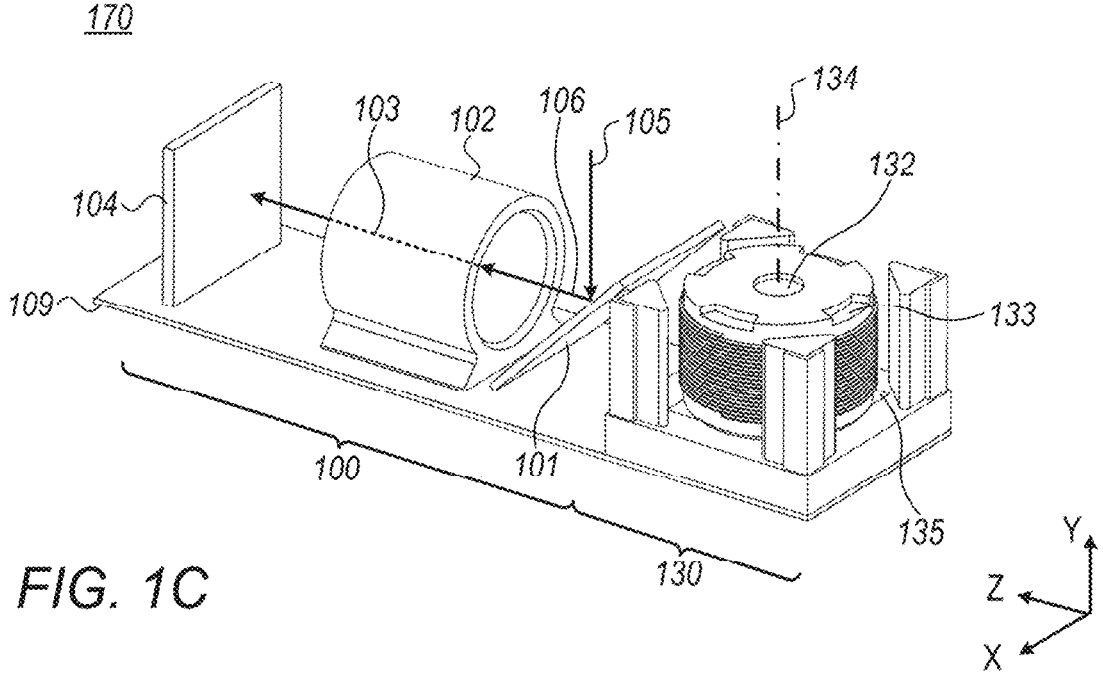
FIG. 1C is a general isometric view of an example of a known camera comprising a folded Tele sub-camera and a Wide sub-camera.
Figure 1D:
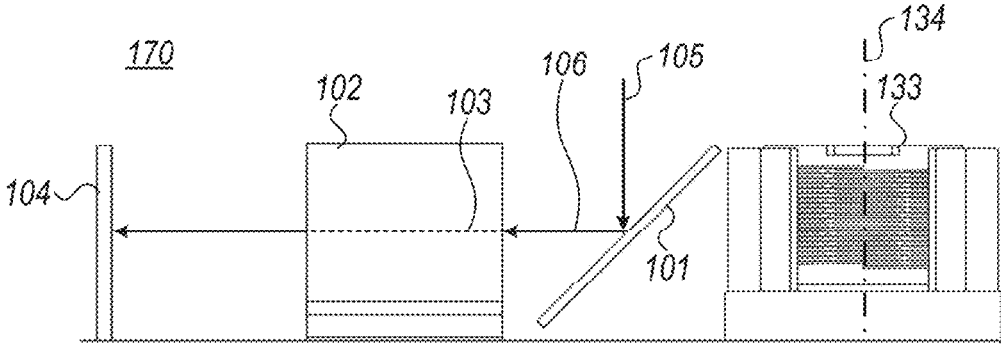
FIG. 1D is a side view of the camera of FIG. 1C.

A possible configuration is described with reference to FIGS. 1C and 1D. In this example, Tele sub-camera 100 is according to the camera described with reference to FIGS. 1A and 1B. The components of Tele sub-camera 100 thus have the same reference numbers as in FIGS. 1A and 1B, and are not described again.

Wide sub-camera 130 can include an aperture 132 (indicating object side of the camera) and an optical lens module 133 (or "Wide lens module") with a symmetry (and optical) axis 134 in the Y direction, as well as a Wide image sensor 135. The Wide lens module is configured to provide a Wide image. The Wide sub-camera has a Wide field of view (FOV$_W$) and the Tele sub-camera has a Tele field of view (FOV$_T$) narrower than FOV$_W$. Notably, in some examples, a plurality of Wide sub-cameras and/or a plurality of Tele sub-cameras can be incorporated and operative in a single digital camera.

According to one example, the Wide image sensor 135 lies in the X-Z plane, while image sensor 104 (which is in this example is a Tele image sensor) lies in a X-Y plane substantially perpendicular to optical axis 103.

In the examples of FIGS. 1A to 1D, camera 100 can further include (or be otherwise operatively connected to) a processing device comprising one or more suitably configured processors (not shown) for performing various processing operations, for example processing the Tele image and the Wide image into a fused output image.

The processing unit may include hardware (HW) and software (SW) specifically dedicated for operating with the digital camera. Alternatively, a processor of an electronic device (e.g. its native CPU) in which the camera is installed can be adapted for executing various processing operations related to the digital camera (including, but not limited to, processing the Tele image and the Wide image into an output image).

Figure 2A:
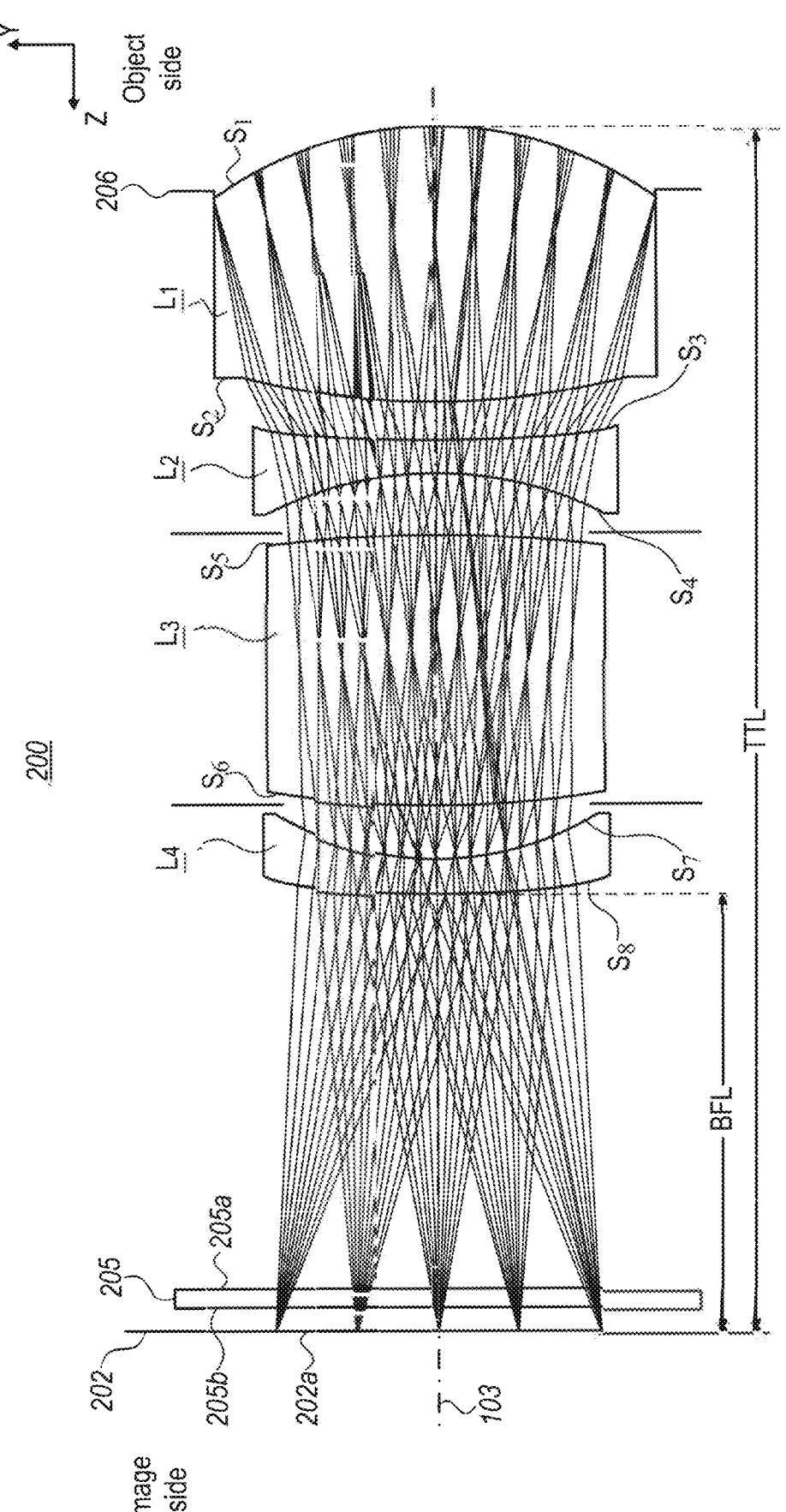
FIG. 2A is a schematic view of one embodiment of lens elements with light rays according to some examples of the presently disclosed subject matter.
Figure 2B:
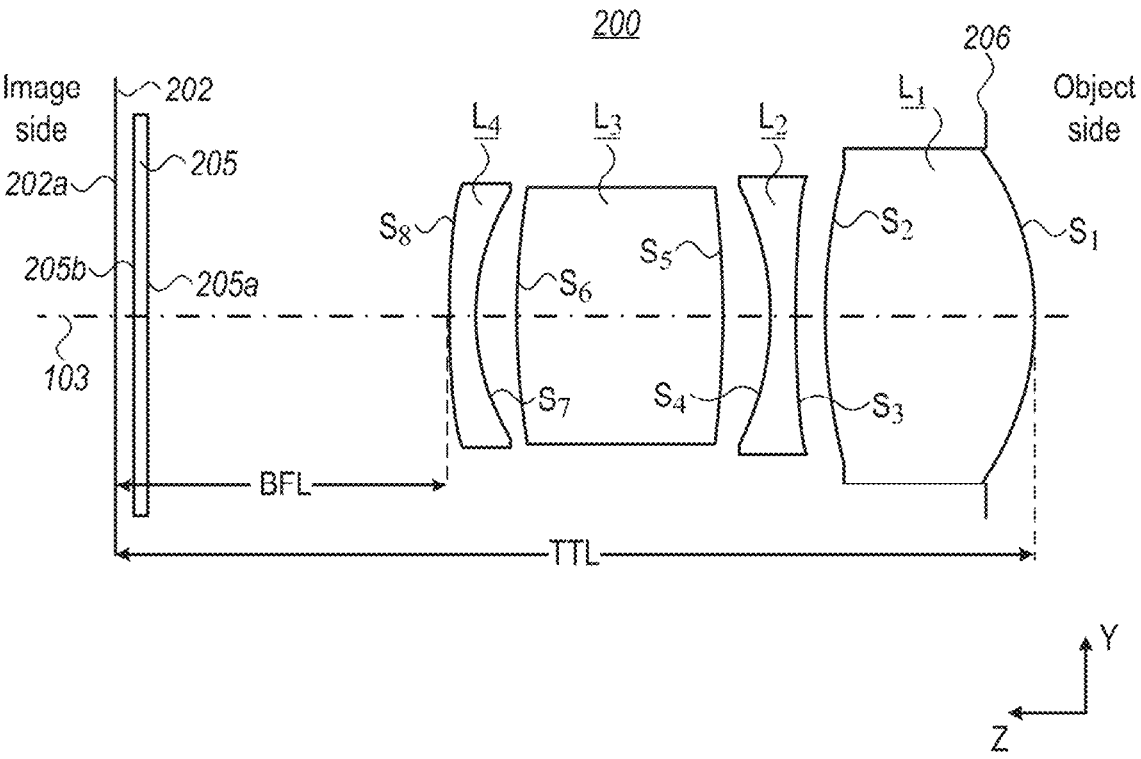
FIG. 2B is another schematic view of the lens elements of FIG. 2A.

Attention is now drawn to FIGS. 2A and 2B, which show schematic view of a lens module 200 having lens elements shown with optical rays according to some examples of the presently disclosed subject matter. Lens module 200 is shown without a lens barrel. FIG. 2A shows optical ray tracing of lens module 200 while FIG. 2B shows only the lens elements for more clarity. In addition, both figures show an image sensor 202 and an optical element 205.

Lens module 200 includes a plurality of N lens elements L$_i$ (wherein "i" is an integer between 1 and N). L$_1$ is the lens element closest to the object side and L$_N$ is the lens element closest to the image side, i.e. the side where the image sensor is located. This order holds for all lenses and lens elements disclosed herein. Lens elements L$_i$ can be used e.g. as lens elements of camera 100 represented in FIGS. 1A and 1B or as lens elements of the Tele sub-camera 100 of FIGS. 1C and 1D. As shown, the N lens elements are axial symmetric along optical axis 103.

In the examples of FIGS. 2A and 2B, N is equal to four. In the examples in FIGS. 6-12, N is equal to 5. This is however not limiting and a different number of lens elements can be used. For example, N can be equal to 3, 6 or 7.

In the examples of FIGS. 2A and 2B, some of the surfaces of the lens elements are represented as convex, and some are represented as concave. The representation of FIGS. 2A and 2B is however not limiting and a different combination of convex and/or concave surfaces can be used, depending on various factors such as the application, the desired optical power, etc.

Optical rays (after their reflection by a reflecting element, such as OPFE 101) pass through lens elements L$_i$ and form an image on an image sensor 202. In the examples of FIGS. 2A and 2B, the optical rays pass through an optical element 205 (which comprises a front surface 205a and a rear surface 205b, and can be e.g. a cut-off filter) also referred to as "optical window" or simply "window" before impinging on image sensor 202. This is however not limiting, and in some examples, optical element 205 is not present. Optical element 205 may be for example infra-red (IR) filter, and/or a glass image sensor dust cover.

Each lens element L$_i$ comprises a respective front surface S$_{2i-1}$ (the index "2i−1" being the number of the front surface) and a respective rear surface S$_{2i}$ (the index "2i" being the number of the rear surface), where "i" is an integer between 1 and N. This numbering convention is used throughout the description. Alternatively, as done throughout this description, lens surfaces are marked as "S$_k$", with k running from 1 to 2N. The front surface and the rear surface can be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

As explained below, a clear height value CH(S$_k$) can be defined for each surface S$_k$ for 1≤k≤2N), and a clear aperture value CA(S$_k$) can be defined for each surface S$_k$ for 1≤k≤2N). CA(S$_k$) and CH(S$_k$) define optical properties of each surface S$_k$ of each lens element.

Figure 3A:
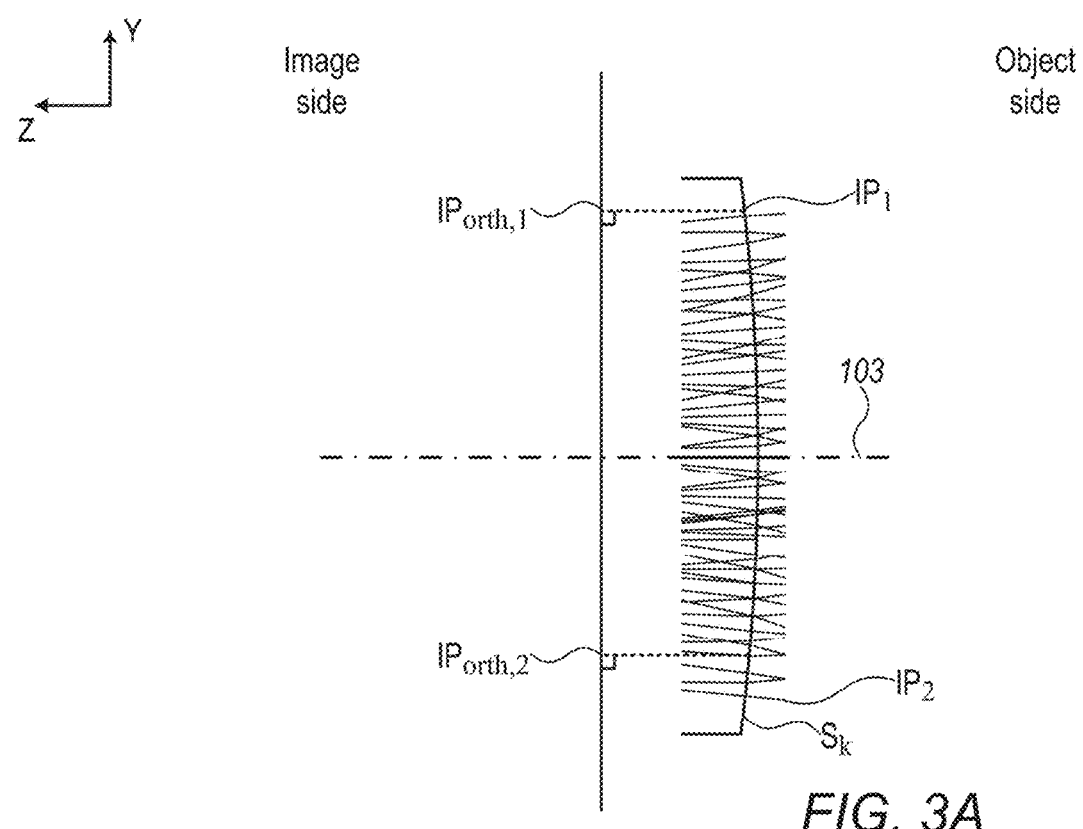
FIG. 3A is a schematic view of impact points of optical rays impinging a convex surface of a lens element, and a schematic view of the orthogonal projection of the impact points on a plane P, according to some examples of the presently disclosed subject matter.
Figure 3B:
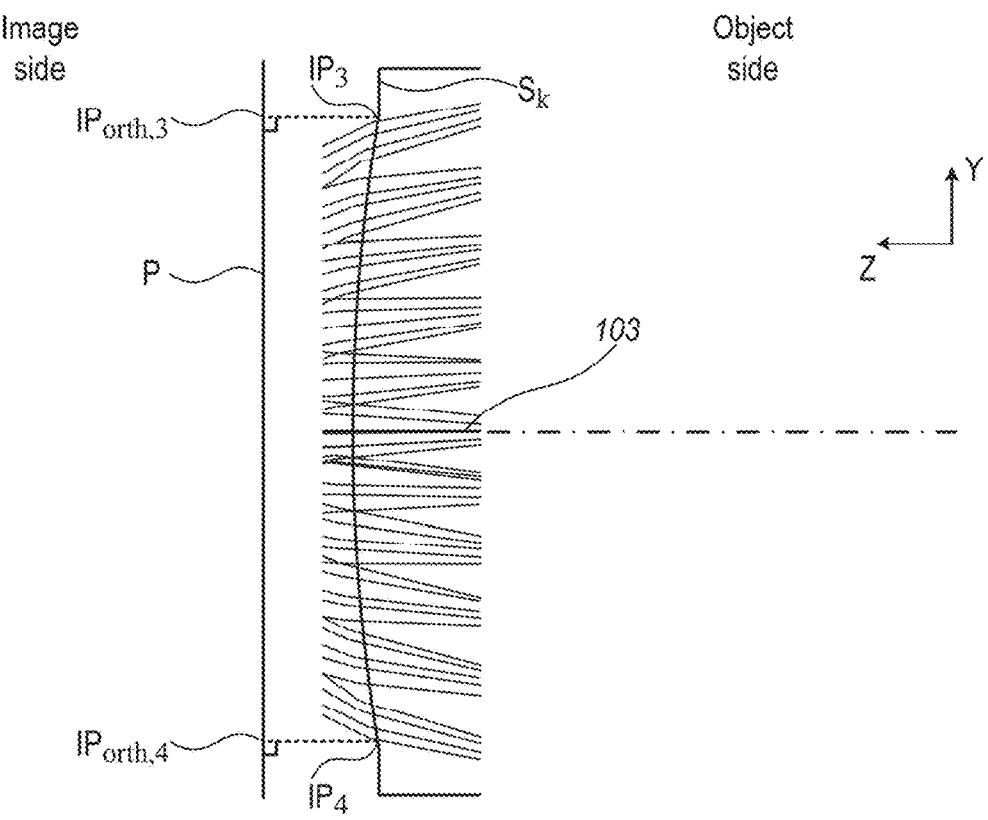
FIG. 3B is a schematic view of impact points of optical rays impinging a concave surface of a lens element, and a schematic view of the orthogonal projection of the impact points on a plane P, according to some examples of the presently disclosed subject matter.
Figure 4:
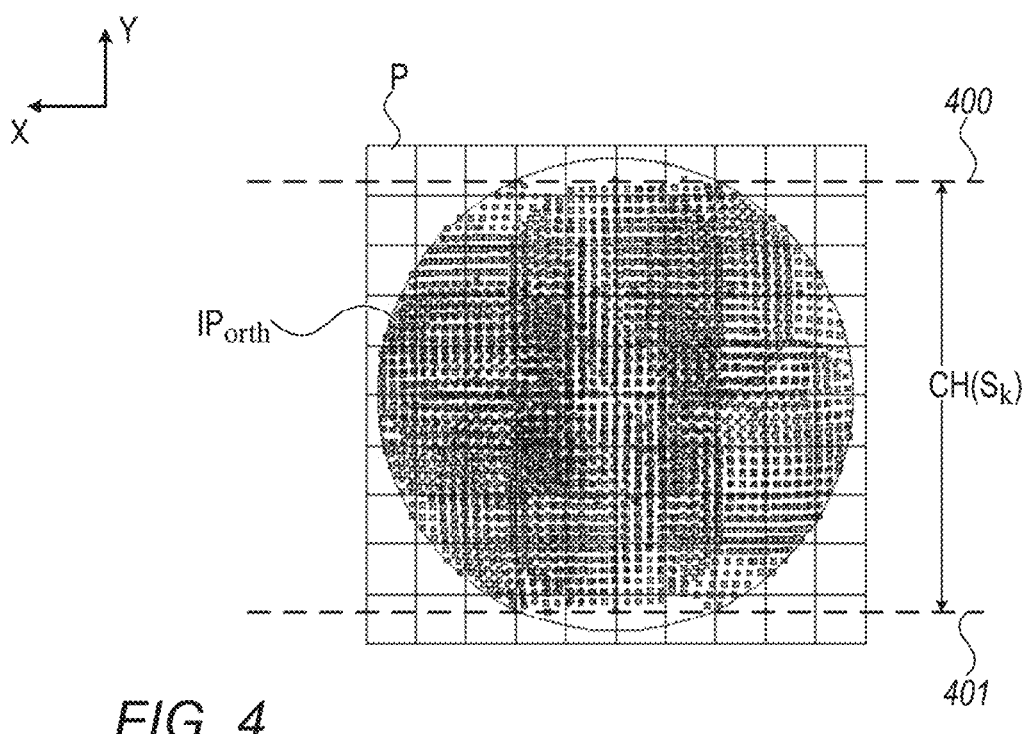
FIG. 4 is a schematic representation of the orthogonal projection of the impact points on a plane P, and of a clear height value ("CH"), according to some examples of the presently disclosed subject matter.

As shown in FIGS. 3A, 3B and 4, each optical ray that passes through a surface S$_k$ (for 1≤k≤2N) impinges this surface on an impact point IP. Optical rays enter lens module 200 from surface S$_1$, and pass through surfaces S$_2$ to S$_2$N consecutively. Some optical rays can impinge on any surface S$_k$ but cannot/will not reach image sensor 202. For a given surface S$_k$, only optical rays that can form an image on image sensor 202 are considered forming a plurality of impact points IP are obtained. CH(S$_k$) is defined as the distance between two closest possible parallel lines (see lines 400 and 401 in FIG. 4 located on a plane P orthogonal to the optical axis of the lens elements (in the representation of FIGS. 3A and 3B, plane P is parallel to plane X-Y and is orthogonal to optical axis 103), such that the orthogonal projection IP$_{orth}$ of all impact points IP on plane P is located between the two parallel lines. CH(S$_k$) can thus be defined for each surface S$_k$ (front and rear surfaces, with 1≤k≤2N).

The definition of CH(S$_k$) does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background that would emit light, contrary to a black background).

For example, FIG. 3A illustrates the orthogonal projections IP$_{orth,1}$, IP$_{orth,2}$ of two impact points IP$_1$ and IP$_2$ on plane P which is orthogonal to optical axis 103. By way of example, in the representation of FIG. 3A, surface S$_k$ is convex.

FIG. 3B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 4, the orthogonal projection $IP_{orth}$ of all impact points IP of a surface $S_k$ on plane P is located between parallel lines 400 and 401. $CH(S_k)$ is thus the distance between lines 400 and 401.

Figure 5:
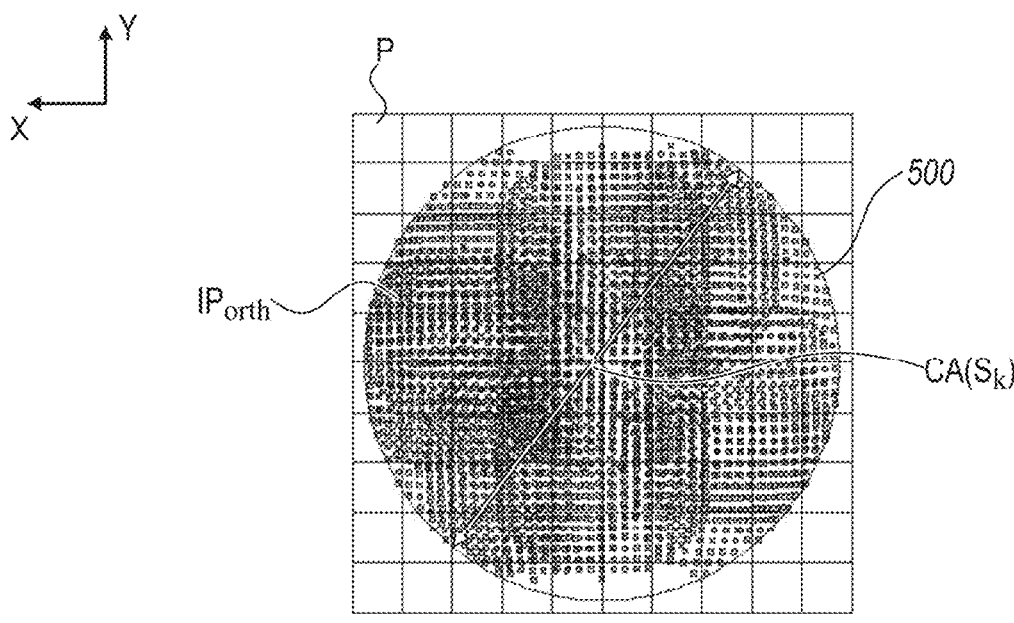
FIG. 5 is a schematic representation of the orthogonal projection of the impact points on a plane P, and of a clear aperture value ("CA"), according to some examples of the presently disclosed subject matter.
Figure 6:
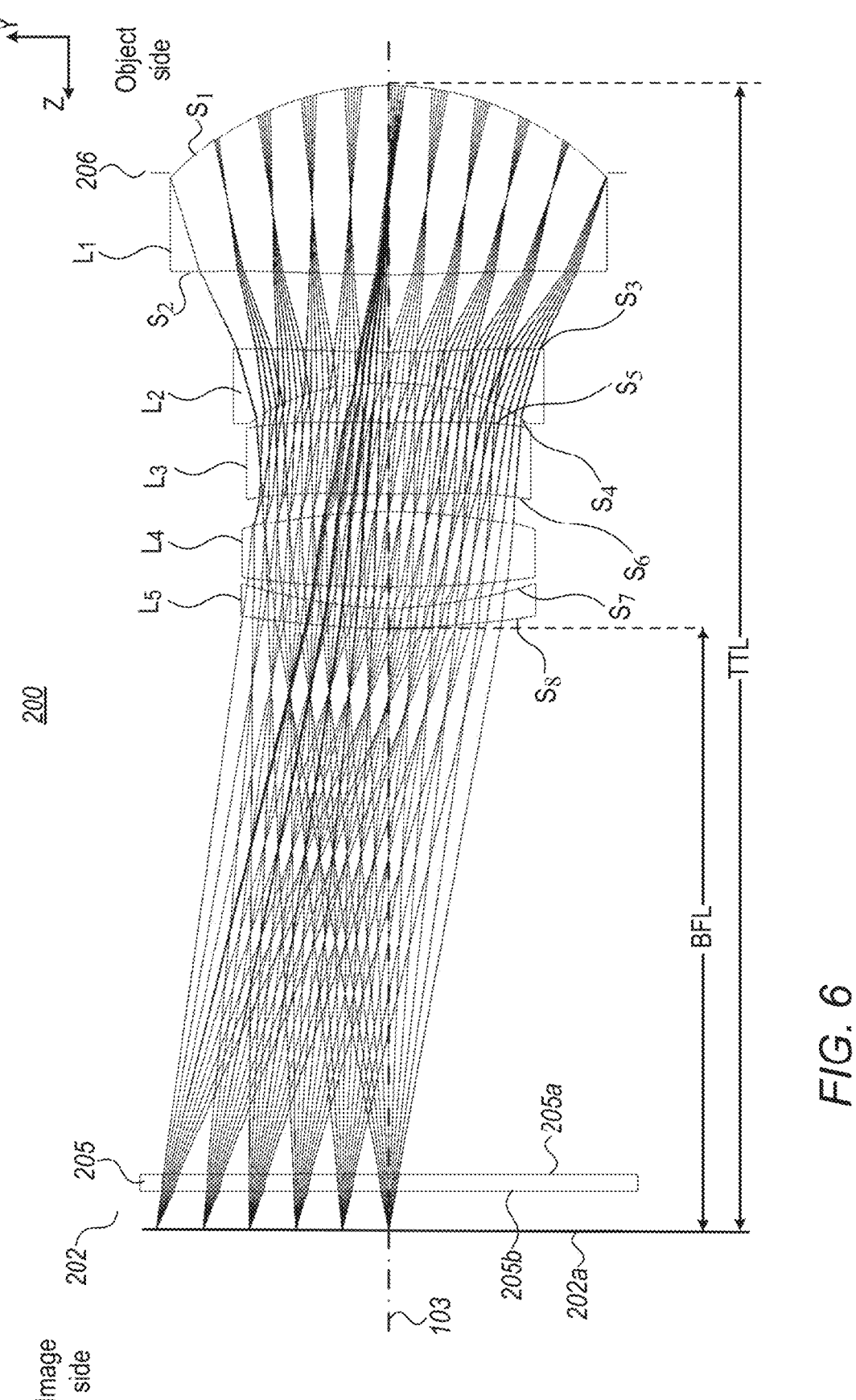
FIG. 6 is a schematic view of another embodiment of lens elements with light rays according to some examples of the presently disclosed subject matter.
Figure 7:
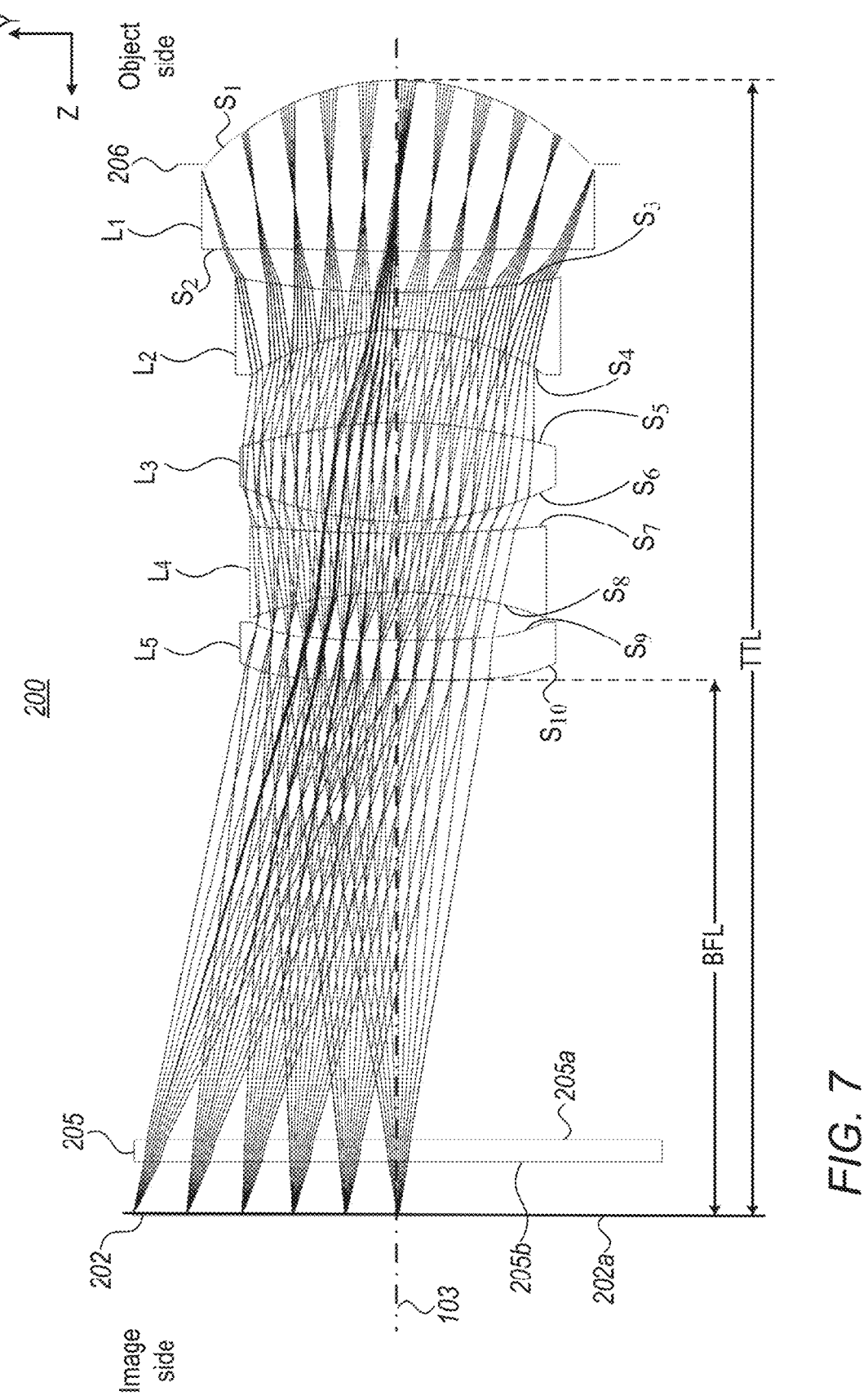
FIG. 7 is a schematic view of yet another embodiment of lens elements with light rays according to some examples of the presently disclosed subject matter.
Figure 8:
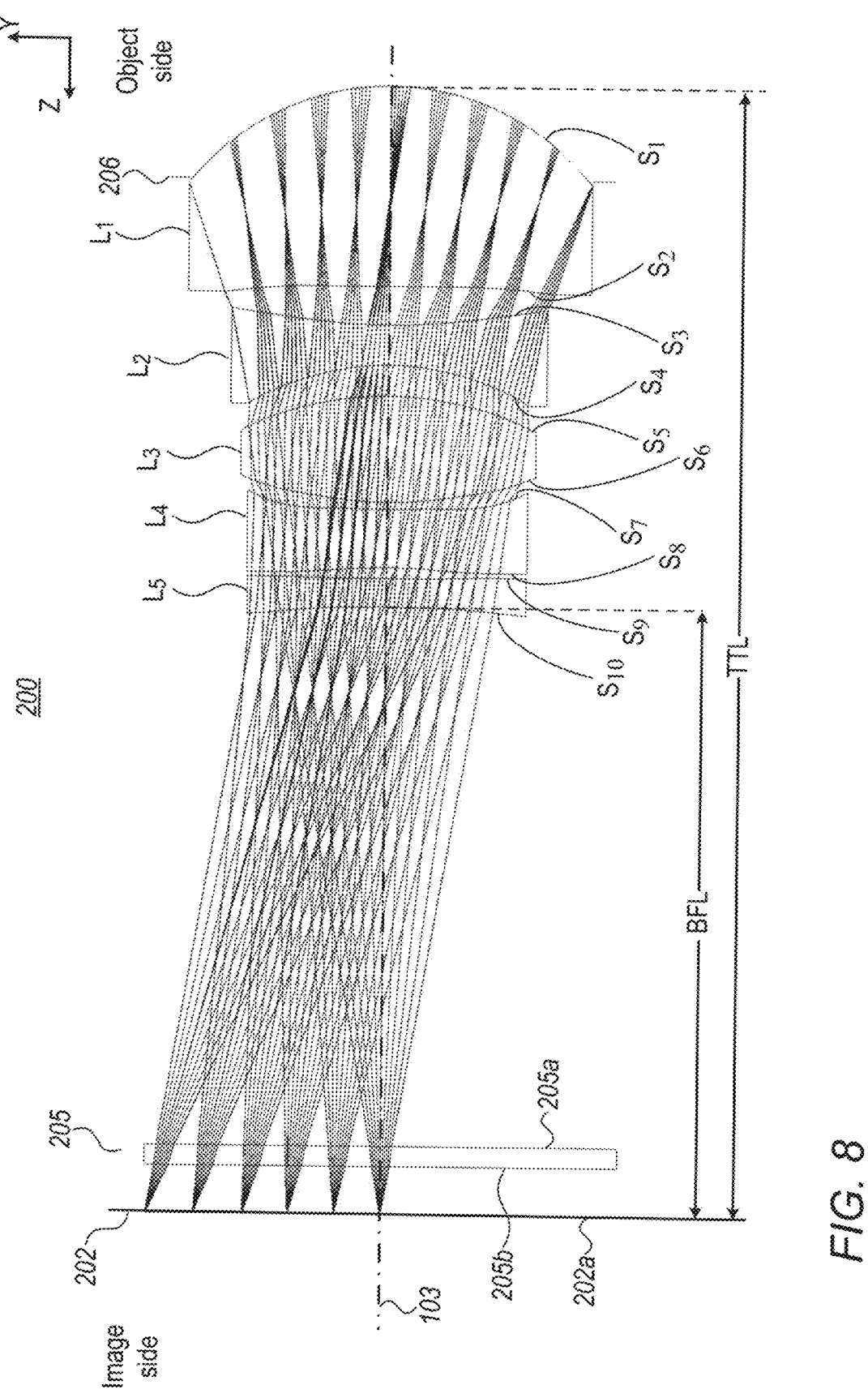
FIG. 8 is a schematic view of yet another embodiment of lens elements with light rays according to some examples of the presently disclosed subject matter.
Figure 9:
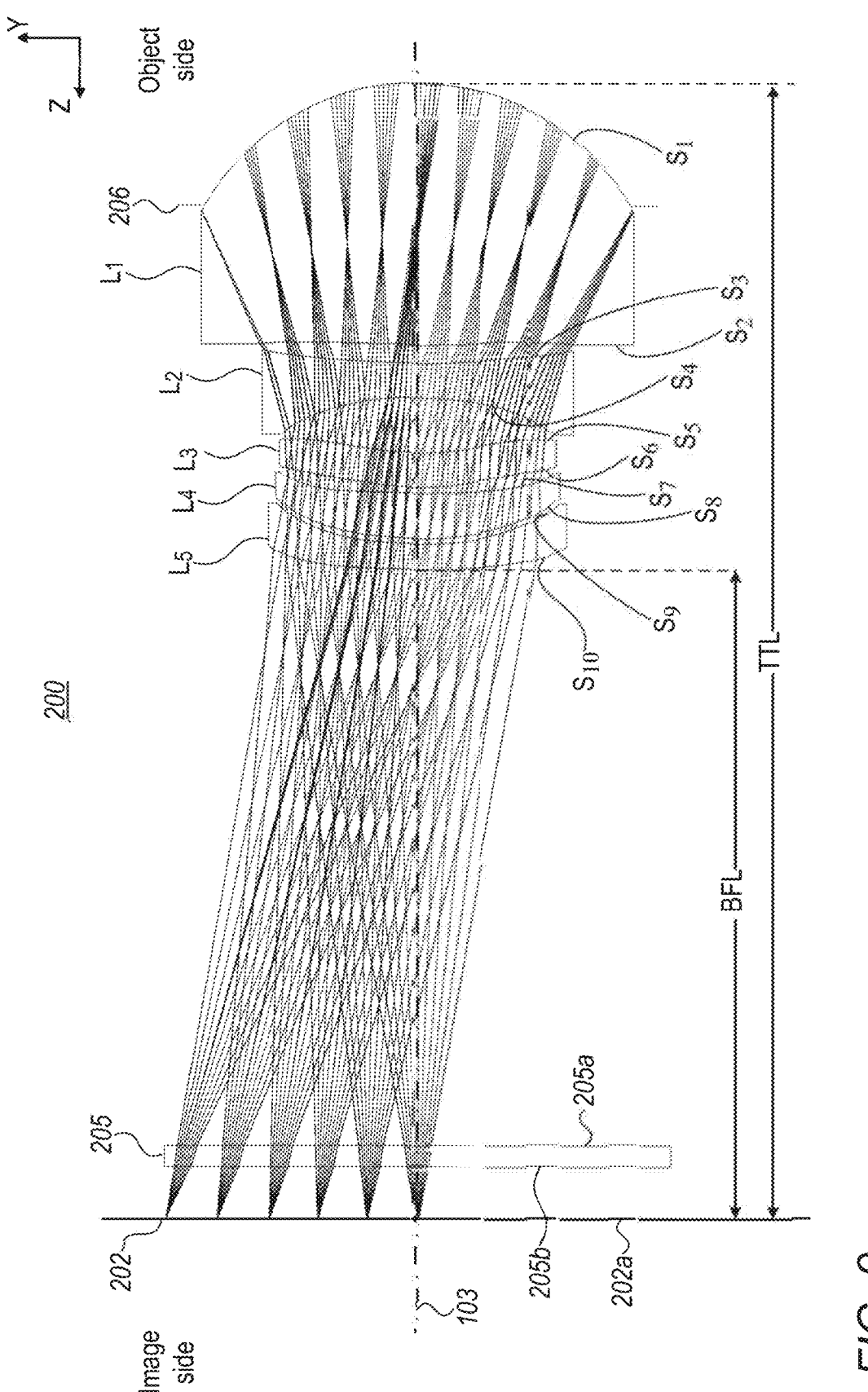
FIG. 9 is a schematic view of yet another embodiment of lens elements with light rays according to some examples of the presently disclosed subject matter.
Figure 10:
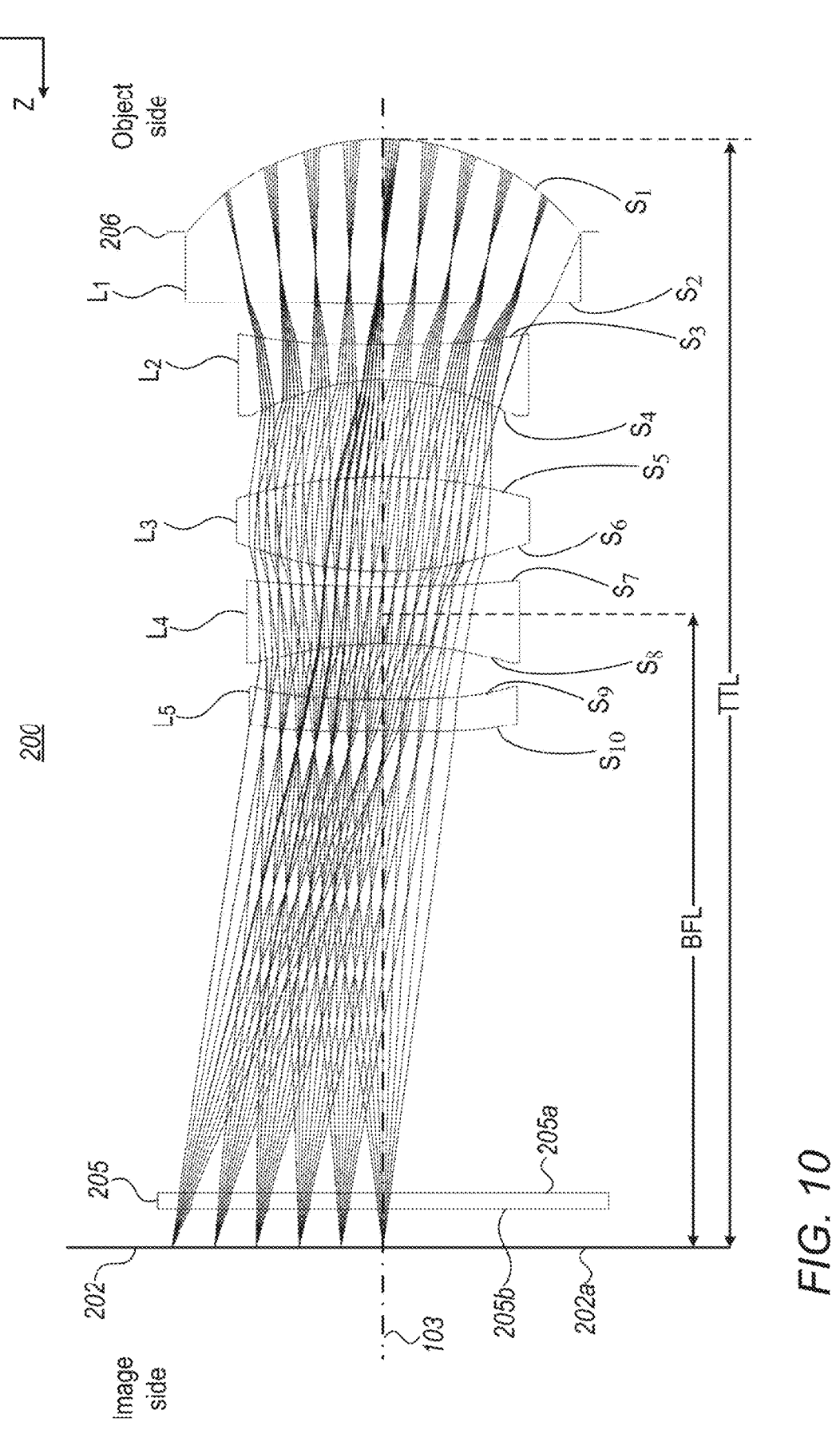
FIG. 10 is a schematic view of yet another embodiment of lens elements with light rays according to some examples of the presently disclosed subject matter.
Figure 11:
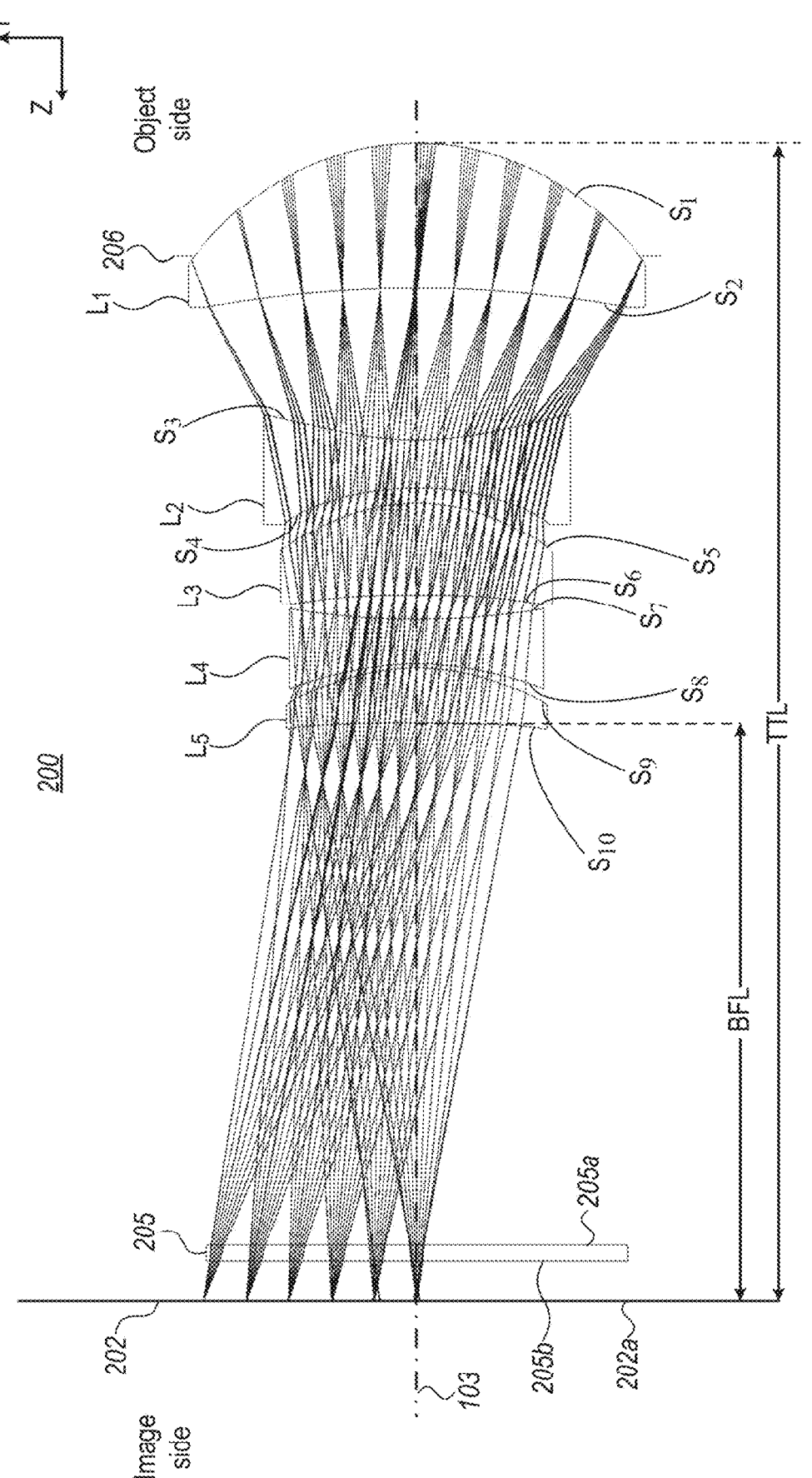
FIG. 11 is a schematic view of yet another embodiment of lens elements with light rays according to some examples of the presently disclosed subject matter.
Figure 12:
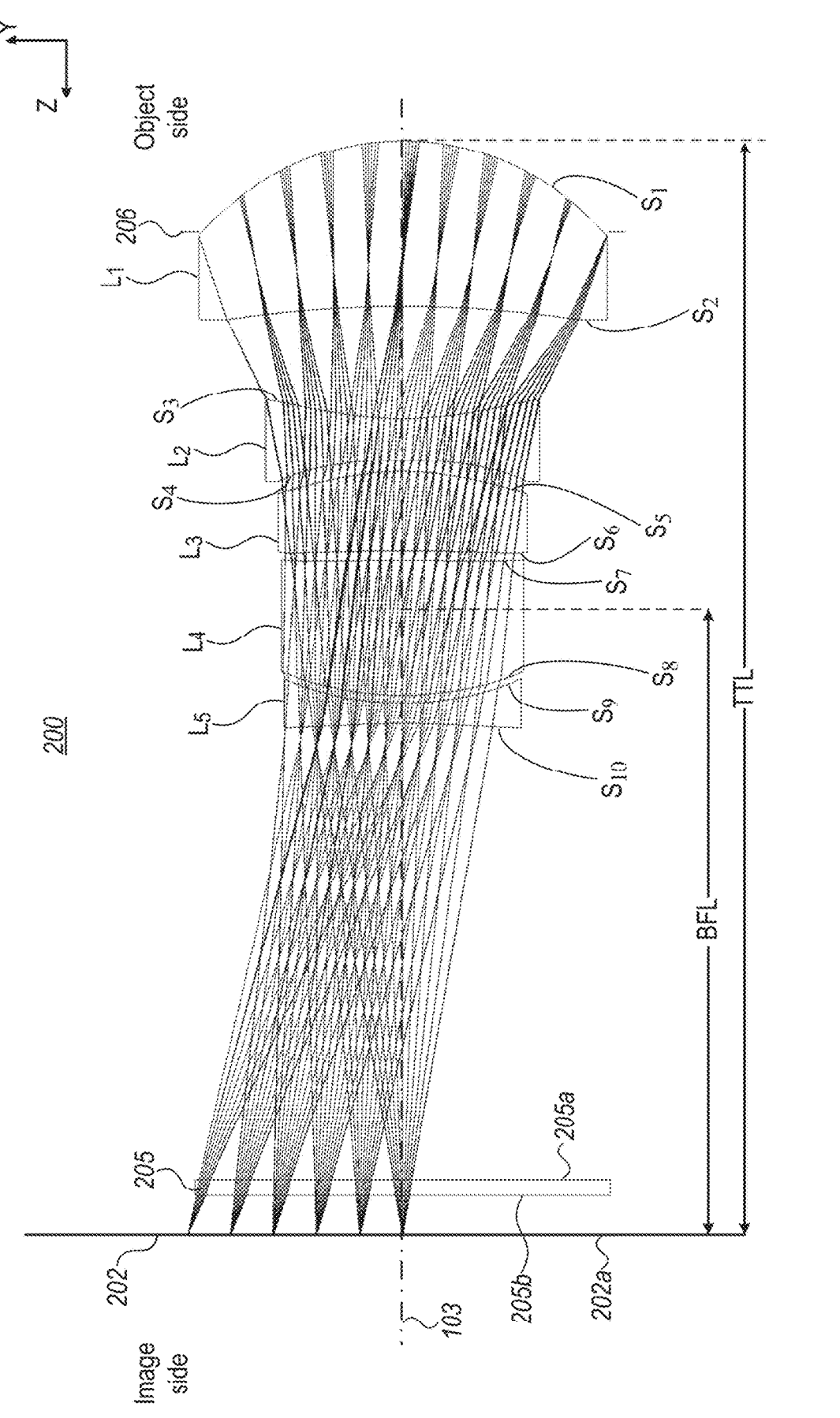
FIG. 12 is a schematic view of yet another embodiment of lens elements with light rays according to some examples of the presently disclosed subject matter.
Figure 13:
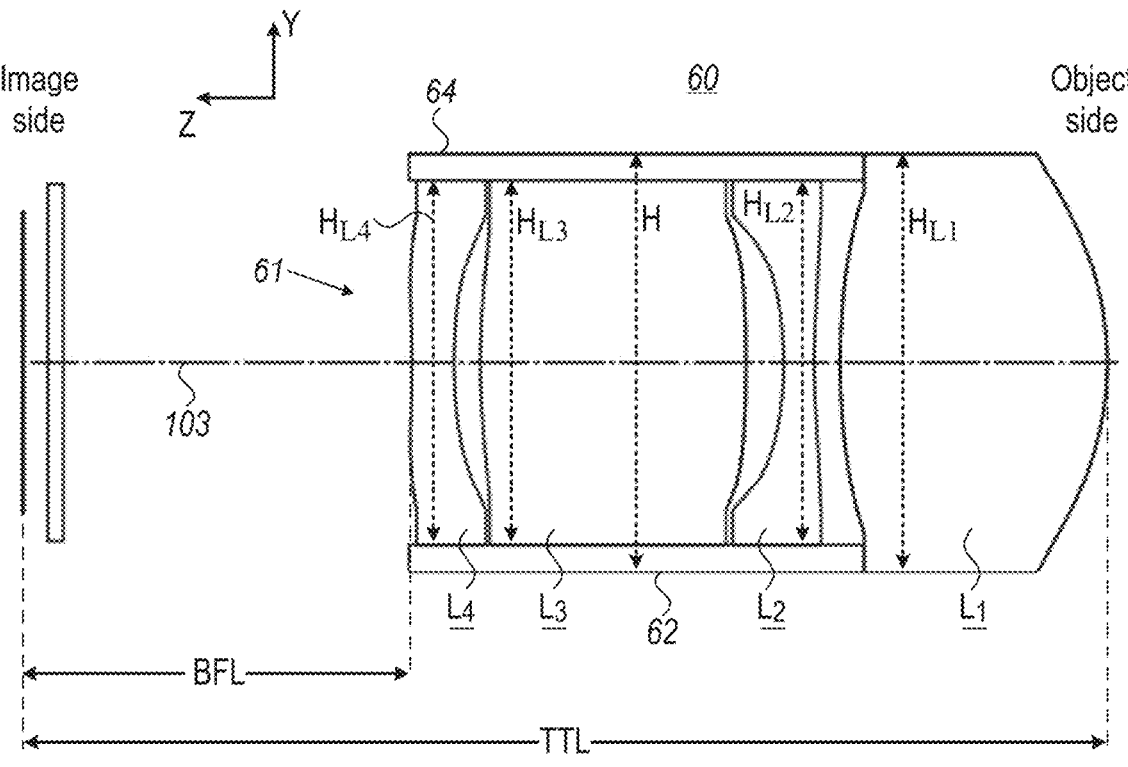
FIG. 13 is a schematic representation of a side view of an optical lens module for holding the lens elements, according to some examples of the presently disclosed subject matter.
Figure 14A:
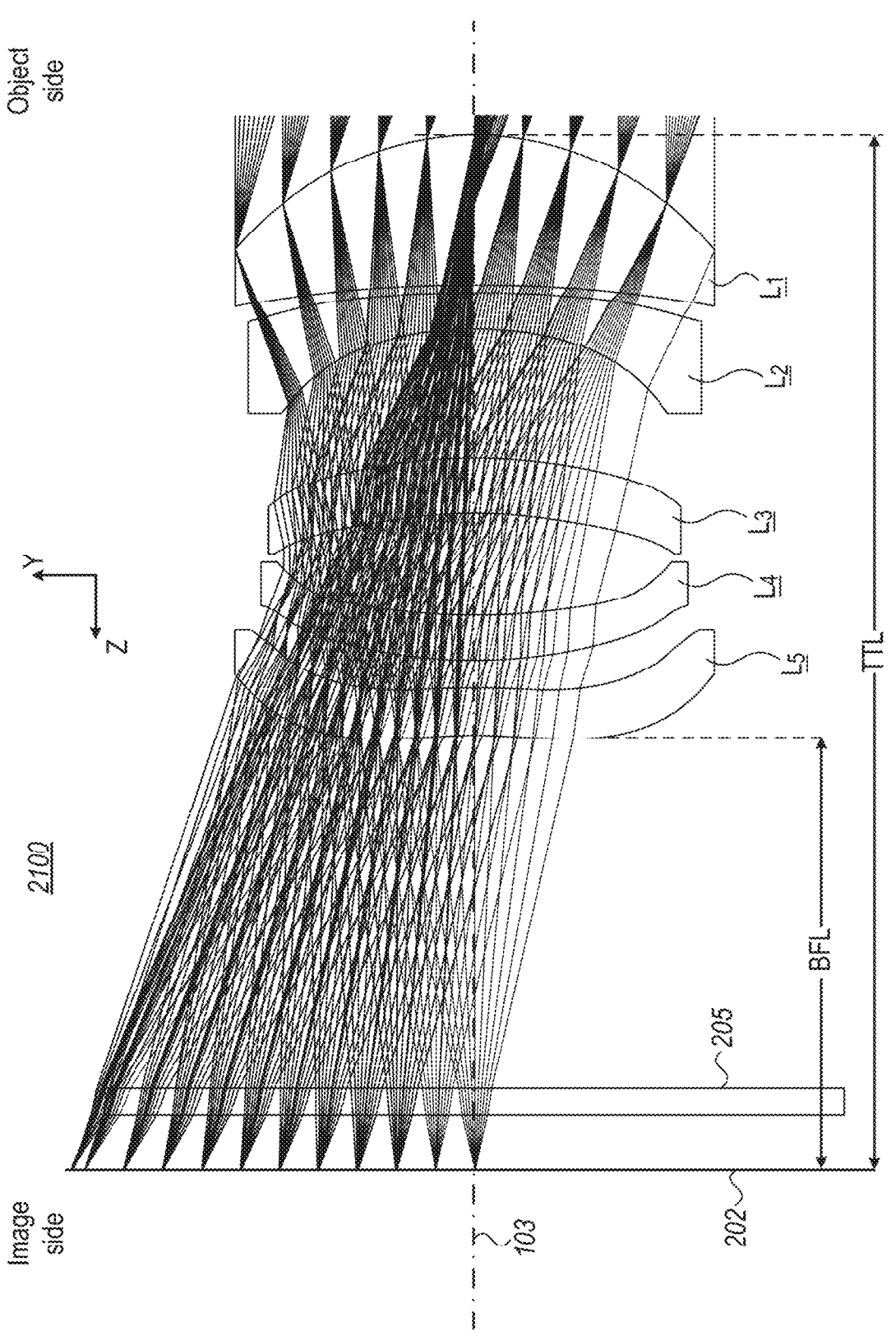
FIG. 14A is a schematic view of another embodiment of lens elements showing light rays, according to another example of the presently disclosed subject matter.
Figure 14B:
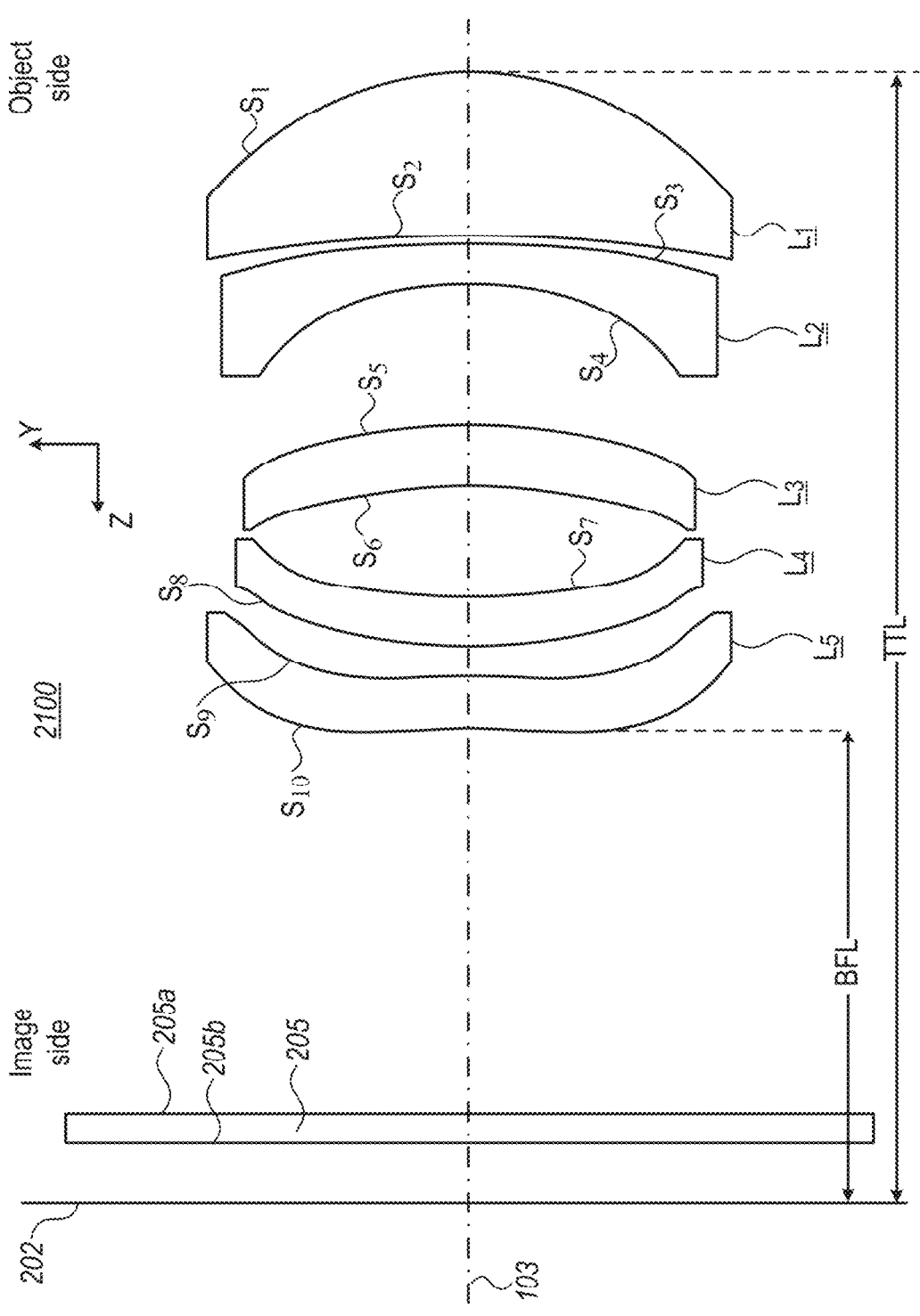
FIG. 14B is another schematic view of the lens elements of FIG. 14A.

Attention is drawn to FIG. 5. According to the presently disclosed subject matter, a clear aperture $CA(S_k)$ is defined for each given surface $S_k$ (for $1 \leq k \leq 2N$), as the diameter of a circle, wherein the circle is the smallest possible circle located in a plane P orthogonal to the optical axis 103 and encircling all orthogonal projections $IP_{orth}$ of all impact points on plane P. As mentioned above with respect to $CH(S_k)$, it is noted that the definition of $CA(S_k)$ also does not depend on the object which is currently imaged.

As shown in FIG. 5, the circumscribed orthogonal projection $IP_{orth}$ of all impact points IP on plane P is circle 500. The diameter of this circle 500 defines $CA(S_k)$.

Detailed optical data and surface data are given in tables below for ten lens (or lens assembly) examples (embodiments) numbered as Ex1, Ex2, . . . Ex 10. The ten lens assembly embodiments Ex1 to Ex10 are also shown in, respectively, FIGS. 2, 6, 7, 8, 9, 10, 11, 12, 13 and 14.

Characteristics Description Tables

Tables 1, 4, 7, 10, 13, 16, 19, 22, 25 and 28 provide respectively a summary of lens properties for each of examples 1-10. For each lens, the following parameters are described:

Effective focal length (EFL), in millimeters (mm).

Total track length (TTL), in mm, defined as the distance from the first surface $S_1$ of the first lens element to the image sensor. In some embodiments, an optical window is positioned in, and included in the TTL.

f number f/#, (unitless number).

Image sensor diagonal length (SDL), in mm.

Back focal length (BFL), in mm, which is the distance from the last surface of the last lens element $S_2N$ to the image sensor. In some embodiments, an optical window is positioned in, and included in the BFL.

Ratio between the TTL and the EFL, TTL/EFL.

Ratio between the BFL and the EFL, BFL/EFL.

Ratio between the clear aperture (CA) of the first surface $S_1$ of the first lens element and the clear aperture of the first surface $S_3$ of the second lens element, $CA(S_1)/CA(S_3)$.

Focal length of each lens element, $f_i$.

Surface Parameters Tables

Tables 2, 5, 8, 11, 14, 17, 20, 23, 26 and 29 provide respectively a description of the surfaces of each element for each of embodiments Ex1, Ex2, . . . Ex 10. For each lens element and each surface, the following parameters are described:

Surface type (see below).

The lens element number L and surface number.

The surface radius in mm, infinity means flat surface.

The thickness between surface i to surface i+1.

The surface refraction index Nd.

The surface abbe number Vd.

The surface half diameter D/2.

Aspheric Surface Coefficients Tables:

Tables 3, 6, 9, 12, 15, 18, 21, 24, 27 and 30 provide respectively a further description of aspheric surfaces of each lens element in each of embodiments Ex1, Ex2, . . . Ex 10.

Surface Types a) Q Type 1 surface sag formula:

$$z = \frac{cr^2}{1 + \sqrt{1-(1+k)c^2r^2}} + D_{con}(u)$$

$$D_{con}(u) = u^4 \sum_{n=0}^{N} A_n Q_n^{con}(u^2)$$

$$u = \frac{r}{r_{max}}, x = u^2$$

$$Q_0^{con}(x) = 1 \qquad Q_1^{con} = -(5-6x)$$

$$Q_2^{con} = 15 - 14x(3-2x)$$

$$Q_3^{con} = -\{35 - 12x[14 - x(21-10x)]\}$$

$$Q_4^{con} = 70 - 3x\{168 - 5x[84 - 11x(8-3x)]\}$$

$$Q_5^{con} = -[126 - x(1260 - 11x\{420 - x[720 - 13x(45 - 14x)]\})]$$

where $\{z, r\}$ are the standard cylindrical polar coordinates, c is the paraxial curvature of the surface, k is the conic parameter, $r_{max}$ is one half of the surfaces clear aperture, and $A_n$ are the polynomial coefficients shown in lens data tables.

b) Even aspheric surfaces formula:

The equation of the surface profiles of each surface $S_k$ (for k between 1 and 2N) is expressed by:

$$z = \frac{cr^2}{1 + \sqrt{1-(1+k)c^2r^2}} +$$
$$A_1r^4 + A_2r^6 + A_3r^8 + A_4r^{10} + A_5r^{12} + A_6r^{14} + A_7r^{16}$$

where "z" is the position of the profile of the surface $S_k$ measured along optical axis 103 (coinciding with the Z axis, wherein z=0 corresponds to the intersection of the profile of the surface $S_k$ with the Z axis), "r" is the distance from optical axis 103 (measured along an axis which is perpendicular to optical axis 103), "K" is the conic coefficient, c=1/R where R is the radius of curvature, and $A_n$ (n from 1 to 7) are coefficients given in Tables 2 and 4 for each surface $S_k$. The maximum value of r, "max r", is equal to D/2.

c) Flat surface;

d) Stop.

The values provided for these examples are purely illustrative and according to other examples, other values can be used.

In the tables below, the units of the radius of curvature ("R"), the lens element thickness ("T") and the clear aperture are expressed in millimeters.

Line "0" of Tables 1, 3 and 5 and 7 describes parameters associated to the object (not visible in the figures); the object is being placed at 1 km from the system, considered to be an infinite distance.

Lines "1" to "8" of Tables 1 to 4 describe respectively parameters associated to surfaces $S_1$ to $S_8$. Lines "1" to "10" of Tables 5 to 8 describe respectively parameters associated with surfaces $S_1$ to $S_{10}$.

Lines "9", "10" and "11" of Tables 1 and 3, and lines "11", "12" and "13" in Tables 5 and 7 describe respectively parameters associated with surfaces 205a, 205b of optical element 205 and of a surface 202a of the image sensor 202.

In lines "i" of Tables 1, 3 and 5 (with i between 1 and 10 in tables 1 and 3 and i between 1 and 12 in Table 5), the thickness corresponds to the distance between surface $S_i$ and surface $S_{i+1}$, measured along the optical axis 103 (which coincides with the Z axis).

In line "11" of Tables 1, 3 (line "13" in Tables 5 and 7), the thickness is equal to zero, since this corresponds to the last surface 202*a*.

Example 1

TABLE 1

| EFL | 13.809 |
| --- | --- |
| TTL | 13.612 |
| F/# | 2.735 |
| SDL/2 | 2.930 |
| BFL | 4.932 |
| TTL/EFL | 0.986 |
| BFL/TTL | 0.362 |
| CA(S$_1$)/CA(S$_3$) | 1.310 |
| T(AS to S$_3$)/TTL | 0.204 |
| SDL/CA(S$_{2N}$) | 1.503 |
| f$_1$ | 5.594 |
| f$_2$ | −4.823 |
| f$_3$ | 9.088 |
| f$_4$ | −10.440 |

TABLE 2

| # | Surface Type | | Comment | R | T | Material | CA/2 | K |
| --- | --- | --- | --- | --- | --- | --- | --- | --- |
| 0 | | | | Infinity | 1.00E+06 | | | |
| 1 | Evn-asph | L$_1$ | S$_1$ | 4.018 | 3.122 | K26R | 2.50 | −0.918 |
| 2 | Evn-asph | | S$_2$ | −8.544 | 0.427 | | 2.20 | −13.319 |
| 3 | Evn-asph | L$_2$ | S$_3$ | −11.602 | 0.383 | EP6000 | 1.90 | −68.256 |
| 4 | Evn-asph | | S$_4$ | 4.252 | 0.668 | | 1.90 | 0.035 |
| 5 | Evn-asph | L$_3$ | S$_5$ | 12.410 | 3.072 | EP6000 | 1.90 | 9.316 |
| 6 | Evn-asph | | S$_6$ | −9.884 | 0.565 | | 1.90 | −50.842 |
| 7 | Evn-asph | L$_4$ | S$_7$ | −5.080 | 0.434 | K26R | 1.90 | −30.682 |
| 8 | Evn-asph | | S$_8$ | −57.279 | 4.429 | | 1.90 | −207.271 |
| 9 | Flat | | | Infinity | 0.210 | BK7 | | |
| 10 | Flat | | | Infinity | 0.289 | | | |
| 11 | Flat | | | Infinity | 0.000 | | | |

TABLE 3

| # | A1 | A2 | A3 | A4 | A5 | A6 | A7 |
| --- | --- | --- | --- | --- | --- | --- | --- |
| 1 | 1.0982E−03 | −5.6900E−05 | 3.0019E−06 | −3.0442E−07 | −2.0532E−07 | 2.1748E−08 | −2.5134E−09 |
| 2 | 1.4662E−03 | −6.8269E−04 | 3.6775E−05 | 1.2874E−07 | −1.5311E−06 | 1.6528E−07 | 0.0000E+00 |
| 3 | −4.4641E−03 | 2.3303E−03 | −6.0231E−04 | 5.0714E−05 | 2.4477E−06 | −3.4785E−07 | −1.2814E−08 |
| 4 | −4.6819E−03 | 2.7039E−03 | −4.9103E−04 | −6.1960E−05 | 4.4187E−05 | −5.1739E−06 | 0.0000E+00 |
| 5 | −8.9765E−04 | 2.5621E−04 | −1.2915E−04 | −5.1021E−06 | 9.6811E−06 | −1.2420E−06 | 0.0000E+00 |
| 6 | −2.6288E−03 | 8.0824E−04 | −4.4175E−05 | −1.8619E−05 | −1.2620E−05 | 4.5041E−06 | 0.0000E+00 |
| 7 | −4.3474E−02 | 8.7969E−03 | −7.7260E−04 | −2.7259E−04 | 1.8367E−05 | 9.9215E−06 | 0.0000E+00 |
| 8 | −1.9365E−02 | 1.5956E−03 | 3.4614E−04 | −1.1796E−04 | −1.3790E−05 | 5.9480E−06 | −2.5281E−07 |

Example 2

TABLE 4

| EFL | 15.001 |
| --- | --- |
| TTL | 14.472 |
| F/# | 2.727 |
| SDL/2 | 2.930 |
| BFL | 7.617 |
| TTL/EFL | 0.965 |
| BFL/TTL | 0.526 |
| CA(S$_1$)/CA(S$_3$) | 1.408 |

TABLE 4-continued

| T(AS to S$_3$)/TTL | 0.157 |
| --- | --- |
| SDL/CA(S$_{2N}$) | 1.577 |
| f$_1$ | 6.359 |
| f$_2$ | −4.495 |
| f$_3$ | 48.439 |
| f$_4$ | 9.909 |
| f$_5$ | −20.537 |

TABLE 5

| Surface # | Surface Type | Comments | | Radius | T | Nd | Vd | D/2 |
|---|---|---|---|---|---|---|---|---|
| 1 | Stop | | stop | Infinity | −1.097 | | | 2.750 |
| 2 | QED_TYPE_1 | $L_1$ | $S_1$ | 3.845 | 2.374 | 1.516 | 64.060 | 2.751 |
| 3 | QED_TYPE_1 | | $S_2$ | −17.752 | 0.989 | | | 2.396 |
| 4 | QED_TYPE_1 | $L_2$ | $S_3$ | −16.427 | 0.385 | 1.640 | 23.523 | 1.954 |
| 5 | QED_TYPE_1 | | $S_4$ | 3.518 | 0.512 | | | 1.758 |
| 6 | QED_TYPE_1 | $L_3$ | $S_5$ | −21.654 | 0.905 | 1.640 | 23.523 | 1.766 |
| 7 | QED_TYPE_1 | | $S_6$ | −12.955 | 0.215 | | | 1.786 |
| 8 | QED_TYPE_1 | $L_4$ | $S_7$ | 7.957 | 0.951 | 1.640 | 23.523 | 1.847 |
| 9 | QED_TYPE_1 | | $S_8$ | −29.721 | 0.272 | | | 1.838 |
| 10 | QED_TYPE_1 | $L_5$ | $S_9$ | −4.061 | 0.252 | 1.535 | 55.664 | 1.831 |
| 11 | QED_TYPE_1 | | $S_{10}$ | −6.584 | 6.907 | | | 1.858 |
| 12 | STANDARD | IR Cut-Off | | Infinity | 0.210 | 1.517 | 64.167 | 3.103 |
| 13 | STANDARD | | | Infinity | 0.500 | | | 3.135 |
| 14 | Image | | | Infinity | — | | | 3.224 |

TABLE 6

| # | k | Max Radius | A0 | A1 | A2 | A3 | A4 | A5 |
|---|---|---|---|---|---|---|---|---|
| 2 | 0.074 | 2.813 | −2.93E−02 | −3.38E−03 | −7.24E−04 | −1.58E−04 | −4.67E−05 | −5.95E−06 |
| 3 | −14.808 | 2.456 | 1.35E−01 | −9.43E−03 | 6.14E−04 | −5.91E−05 | 6.47E−06 | 2.94E−06 |
| 4 | −260.952 | 2.038 | 3.85E−02 | 1.69E−03 | −1.58E−03 | 9.57E−04 | −2.90E−04 | 8.48E−05 |
| 5 | 0.865 | 1.803 | 1.21E−02 | 1.04E−02 | −4.00E−04 | 7.26E−04 | −1.63E−04 | −1.71E−05 |
| 6 | 118.036 | 2.901 | 3.26E−01 | −4.74E−01 | −1.21E−01 | 1.12E−02 | 2.07E−02 | 2.56E−03 |
| 7 | −91.610 | 1.824 | 1.84E−01 | −1.92E−02 | 4.09E−03 | −3.58E−03 | 3.80E−04 | 1.15E−04 |
| 8 | −0.881 | 1.858 | 1.38E−02 | −2.60E−03 | 8.05E−03 | −3.43E−03 | 3.72E−04 | 1.36E−04 |
| 9 | 178.397 | 1.885 | −5.13E−02 | 1.21E−02 | 3.82E−03 | −1.39E−03 | −2.96E−04 | 2.58E−04 |
| 10 | −6.965 | 1.883 | 4.37E−02 | −1.76E−02 | 1.08E−02 | −5.19E−03 | −4.49E−04 | 2.28E−04 |
| 11 | −4.710 | 1.939 | 1.13E−01 | −2.82E−02 | 1.39E−03 | 3.11E−04 | −2.07E−04 | 2.98E−05 |

Example 3

TABLE 7

| EFL | 10.911 |
|---|---|
| TTL | 10.585 |
| F/# | 2.819 |
| SDL/2 | 2.620 |
| BFL | 5.000 |
| TTL/EFL | 0.970 |
| BFL/TTL | 0.472 |

TABLE 7-continued

| $CA(S_1)/CA(S_3)$ | 1.212 |
|---|---|
| $T(AS$ to $S_3)/TTL$ | 0.113 |
| $SDL/CA(S_{2N})$ | 1.678 |
| $f_1$ | 4.519 |
| $f_2$ | −3.153 |
| $f_3$ | 3.343 |
| $f_4$ | −5.268 |
| $f_5$ | −35.623 |

TABLE 8

| Surface # | Surface Type | Comments | | Radius | T | Nd | Vd | D/2 |
|---|---|---|---|---|---|---|---|---|
| 1 | Stop | | Stop | Infinity | −0.778 | | | 1.935 |
| 2 | QED_TYPE_1 | $L_1$ | $S_1$ | 2.743 | 1.586 | 1.535 | 55.664 | 1.940 |
| 3 | QED_TYPE_1 | | $S_2$ | −16.221 | 0.386 | | | 1.722 |
| 4 | QED_TYPE_1 | $L_2$ | $S_3$ | −12.522 | 0.353 | 1.640 | 23.523 | 1.601 |
| 5 | QED_TYPE_1 | | $S_4$ | 2.431 | 0.863 | | | 1.444 |
| 6 | QED_TYPE_1 | $L_3$ | $S_5$ | 4.625 | 0.917 | 1.640 | 23.523 | 1.562 |
| 7 | QED_TYPE_1 | | $S_6$ | −3.670 | 0.122 | | | 1.562 |
| 8 | QED_TYPE_1 | $L_4$ | $S_7$ | −13.647 | 0.541 | 1.640 | 23.523 | 1.460 |
| 9 | QED_TYPE_1 | | $S_8$ | 4.544 | 0.455 | | | 1.433 |
| 10 | QED_TYPE_1 | $L_5$ | $S_9$ | −66.355 | 0.362 | 1.535 | 55.664 | 1.443 |
| 11 | QED_TYPE_1 | | $S_{10}$ | 26.775 | 4.290 | | | 1.561 |
| 12 | STANDARD | IR Cut-Off | | Infinity | 0.210 | 1.517 | 64.167 | 2.577 |
| 13 | STANDARD | | | Infinity | 0.500 | | | 2.608 |
| 14 | Image | | | Infinity | — | | | 2.722 |

TABLE 9

| # | k | Max Radius | A0 | A1 | A2 | A3 | A4 | A5 |
|---|---|---|---|---|---|---|---|---|
| 2 | 0.074 | 2.813 | −2.93E−02 | −3.38E−03 | −7.24E−04 | −1.58E−04 | −4.67E−05 | −5.95E−06 |
| 3 | −14.808 | 2.456 | 1.35E−01 | −9.43E−03 | 6.14E−04 | −5.91E−05 | 6.47E−06 | 2.94E−06 |
| 4 | −260.952 | 2.038 | 3.85E−02 | 1.69E−03 | −1.58E−03 | 9.57E−04 | −2.90E−04 | 8.48E−05 |
| 5 | 0.865 | 1.803 | 1.21E−02 | 1.04E−02 | −4.00E−04 | 7.26E−04 | −1.63E−04 | −1.71E−05 |
| 6 | 118.036 | 2.901 | 3.26E−01 | −4.74E−01 | −1.21E−01 | 1.12E−02 | 2.07E−02 | 2.56E−03 |
| 7 | −91.610 | 1.824 | 1.84E−01 | −1.92E−02 | 4.09E−03 | −3.58E−03 | 3.80E−03 | 1.15E−04 |
| 8 | −0.881 | 1.858 | 1.38E−02 | −2.60E−03 | 8.05E−03 | −3.43E−03 | 3.72E−04 | 1.36E−04 |
| 9 | 178.397 | 1.885 | −5.13E−02 | 1.21E−02 | 3.82E−03 | −1.39E−03 | −2.96E−04 | 2.58E−04 |
| 10 | −6.965 | 1.883 | 4.37E−02 | −1.76E−02 | 1.08E−03 | −5.19E−04 | −4.49E−04 | 2.28E−04 |
| 11 | −4.710 | 1.939 | 1.13E−01 | −2.82E−02 | 1.39E−03 | 3.11E−04 | −2.07E−04 | 2.98E−05 |

Example 4

TABLE 10

| | |
|---|---|
| EFL | 12.166 |
| TTL | 11.856 |
| F/# | 2.704 |
| SDL/2 | 2.620 |
| BFL | 6.382 |
| TTL/EFL | 0.975 |
| BFL/TTL | 0.538 |
| $CA(S_1)/CA(S_3)$ | 1.277 |
| $T(AS \text{ to } S_3)/TTL$ | 0.129 |
| $SDL/CA(S_{2N})$ | 1.685 |
| $f_1$ | 5.426 |
| $f_2$ | −2.822 |
| $f_3$ | 3.047 |
| $f_4$ | −7.208 |
| $f_5$ | −27.026 |

TABLE 11

| Surface # | Surface Type | Comments | | Radius | T | Nd | Vd | D/2 |
|---|---|---|---|---|---|---|---|---|
| 1 | Stop | | Stop | Infinity | −0.978 | | | 2.250 |
| 2 | QED_TYPE_1 | $L_1$ | $S_1$ | 3.023 | 2.106 | 1.516 | 64.060 | 2.250 |
| 3 | QED_TYPE_1 | | $S_2$ | −29.206 | 0.407 | | | 1.843 |
| 4 | QED_TYPE_1 | $L_2$ | $S_3$ | −6.031 | 0.416 | 1.640 | 23.523 | 1.763 |
| 5 | QED_TYPE_1 | | $S_4$ | 2.646 | 0.332 | | 23.523 | 1.568 |
| 6 | QED_TYPE_1 | $L_3$ | $S_5$ | 3.603 | 1.116 | 1.640 | | 1.642 |
| 7 | QED_TYPE_1 | | $S_6$ | −3.735 | 0.070 | | 23.523 | 1.622 |
| 8 | QED_TYPE_1 | $L_4$ | $S_7$ | −30.886 | 0.615 | 1.640 | 55.664 | 1.561 |
| 9 | QED_TYPE_1 | | $S_8$ | 5.462 | 0.119 | | | 1.554 |
| 10 | QED_TYPE_1 | $L_5$ | $S_9$ | −49.166 | 0.295 | 1.535 | | 1.554 |
| 11 | QED_TYPE_1 | | $S_{10}$ | 20.515 | 5.672 | | | 1.555 |
| 12 | STANDARD | IR Cut-Off | | Infinity | 0.210 | 1.517 | 64.167 | 2.605 |
| 13 | STANDARD | | | Infinity | 0.500 | | | 2.631 |
| 14 | Image | | | Infinity | — | | | 2.725 |

TABLE 12

| # | k | Max Radius | A0 | A1 | A2 | A3 | A4 | A5 |
|---|---|---|---|---|---|---|---|---|
| 2 | 0.097 | 10.740 | −1.14E+00 | −3.78E−01 | −1.15E+00 | −5.05E−01 | 4.05E−02 | 2.96E−02 |
| 3 | −261.050 | 2.024 | 1.73E−01 | −2.44E−02 | 3.83E−03 | −6.77E−04 | 3.10E−04 | −3.83E−05 |
| 4 | −38.977 | 253.807 | −7.72E+04 | −6.74E+03 | −5.63E+04 | −1.10E+04 | −2.48E+03 | 7.12E+02 |
| 5 | −0.586 | 1.772 | −9.01E−02 | 4.03E−02 | −1.91E−03 | 2.21E−03 | −4.26E−04 | 1.26E−04 |
| 6 | 0.379 | 2.072 | −1.12E−01 | −1.14E−03 | −2.63E−02 | −4.36E−03 | −3.34E−03 | 3.22E−04 |
| 7 | −6.473 | 1.511 | 5.60E−02 | −2.76E−02 | 4.57E−03 | −5.15E−04 | 6.83E−06 | 2.84E−07 |
| 8 | 21.169 | 2.093 | −4.58E−01 | 9.64E−03 | 4.79E−02 | −5.53E−03 | 7.19E−03 | 2.01E−03 |
| 9 | −10.145 | 2.694 | −4.74E−01 | 1.22E−01 | −7.53E−02 | 3.93E−02 | 2.39E−02 | 3.19E−03 |
| 10 | −12510.811 | 2.547 | −2.52E−01 | −9.58E−02 | −2.01E−02 | 1.14E−02 | −6.12E−03 | 4.40E−03 |
| 11 | 104.159 | 2.013 | −2.44E−02 | −3.44E−02 | 5.39E−03 | 7.10E−03 | −1.89E−05 | 6.12E−04 |

Example 5

TABLE 13

| | |
|---|---|
| EFL | 12.020 |
| TTL | 11.216 |
| F/# | 2.671 |
| SDL/2 | 2.620 |
| BFL | 6.412 |
| TTL/EFL | 0.933 |
| BFL/TTL | 0.572 |
| $CA(S_1)/CA(S_3)$ | 1.388 |
| $T(AS \text{ to } S_3)/TTL$ | 0.138 |
| $SDL/CA(S_{2N})$ | 1.692 |
| $f_1$ | 4.681 |
| $f_2$ | −4.152 |
| $f_3$ | 34.206 |
| $f_4$ | 11.682 |
| $f_5$ | −12.516 |

TABLE 14

| Surface # | Surface Type | Comments | | Radius | T | Nd | Vd | D/2 |
|---|---|---|---|---|---|---|---|---|
| 1 | Stop | | stop | Infinity | −1.215 | | | 2.250 |
| 2 | QED_TYPE_1 | $L_1$ | $S_1$ | 2.692 | 2.587 | 1.516 | 64.060 | 2.254 |
| 3 | QED_TYPE_1 | | $S_2$ | −15.936 | 0.181 | | | 1.658 |
| 4 | QED_TYPE_1 | $L_2$ | $S_3$ | −9.317 | 0.339 | 1.640 | 23.523 | 1.623 |
| 5 | QED_TYPE_1 | | $S_4$ | 3.768 | 0.548 | | | 1.427 |
| 6 | QED_TYPE_1 | $L_3$ | $S_5$ | −3.081 | 0.344 | 1.640 | 23.523 | 1.431 |
| 7 | QED_TYPE_1 | | $S_6$ | −2.818 | 0.058 | | | 1.436 |
| 8 | QED_TYPE_1 | $L_4$ | $S_7$ | −12.050 | 0.443 | 1.640 | 23.523 | 1.431 |
| 9 | QED_TYPE_1 | | $S_8$ | −4.679 | 0.052 | | | 1.478 |
| 10 | QED_TYPE_1 | $L_5$ | $S_9$ | −6.654 | 0.252 | 1.535 | 55.664 | 1.467 |
| 11 | QED_TYPE_1 | | $S_{10}$ | −1131.9 | 5.702 | | | 1.549 |
| 12 | STANDARD | IR Cut-Off | | Infinity | 0.210 | 1.516 | 64.060 | 2.612 |
| 13 | STANDARD | | | Infinity | 0.500 | | | 2.637 |
| 14 | Image | | | Infinity | — | | | 2.727 |

TABLE 15

| # | k | Max Radius | A0 | A1 | A2 | A3 | A4 | A5 |
|---|---|---|---|---|---|---|---|---|
| 2 | 0.175 | 2.254 | −4.80E−02 | −7.31E−03 | −1.54E−03 | −3.16E−04 | −7.65E−05 | −1.79E−05 |
| 3 | −69.109 | 2.024 | 2.01E−01 | 3.26E−02 | 2.49E−02 | 8.80E−03 | 3.07E−03 | 2.76E−04 |
| 4 | 8.691 | 1.742 | 3.57E−02 | −1.40E−02 | 2.26E−03 | −8.42E−04 | 3.43E−04 | −3.22E−04 |
| 5 | 3.284 | 1.772 | 1.82E−01 | 8.25E−02 | 4.37E−02 | 1.90E−02 | 6.76E−03 | 5.25E−04 |
| 6 | −21.369 | 2.072 | 2.11E−01 | −5.55E−02 | −4.95E−04 | 5.96E−02 | 3.38E−02 | 1.00E−02 |
| 7 | −9.992 | 1.511 | 7.69E−02 | −1.67E−02 | 5.04E−03 | −1.17E−03 | −1.05E−03 | 4.58E−05 |
| 8 | 58.607 | 2.093 | −2.42E−01 | 1.14E−01 | 8.63E−02 | −2.04E−03 | 1.40E−02 | 7.34E−03 |
| 9 | −26.270 | 2.694 | −7.16E−01 | 4.52E−01 | −1.20E−01 | 1.99E−02 | 1.30E−01 | 6.23E−02 |
| 10 | −100.550 | 2.547 | −2.11E+00 | −2.56E−02 | −1.63E−01 | 8.43E−03 | 4.58E−02 | 3.64E−02 |
| 11 | 99.618 | 2.013 | −6.20E−01 | −2.06E−03 | −9.25E−03 | 8.76E−03 | 1.55E−03 | 1.46E−03 |

Example 6

TABLE 16

| | |
|---|---|
| EFL | 15.000 |
| TTL | 14.507 |
| F/# | 2.727 |
| SDL/2 | 2.930 |
| BFL | 6.750 |
| TTL/EFL | 0.967 |
| BFL/TTL | 0.465 |

TABLE 16-continued

| | |
|---|---|
| $CA(S_1)/CA(S_3)$ | 1.361 |
| $T(AS \text{ to } S_3)/TTL$ | 0.103 |
| $SDL/CA(S_{2N})$ | 1.581 |
| $f_1$ | 6.186 |
| $f_2$ | −4.313 |
| $f_3$ | 4.578 |
| $f_4$ | −7.114 |
| $f_5$ | −48.010 |

TABLE 17

| Surface # | Surface Type | Comments | | Radius | T | Nd | Vd | D/2 |
|---|---|---|---|---|---|---|---|---|
| 1 | Stop | | stop | Infinity | −1.203 | | | 2.750 |
| 2 | QED_TYPE_1 | $L_1$ | $S_1$ | 3.750 | 2.162 | 1.535 | 55.664 | 2.742 |
| 3 | QED_TYPE_1 | | $S_2$ | −22.438 | 0.539 | | | 2.315 |
| 4 | QED_TYPE_1 | $L_2$ | $S_3$ | −17.108 | 0.457 | 1.640 | 23.523 | 2.015 |
| 5 | QED_TYPE_1 | | $S_4$ | 3.324 | 1.262 | | | 1.829 |
| 6 | QED_TYPE_1 | $L_3$ | $S_5$ | 6.131 | 1.245 | 1.640 | 23.523 | 2.029 |
| 7 | QED_TYPE_1 | | $S_6$ | −5.162 | 0.187 | | | 2.030 |
| 8 | QED_TYPE_1 | $L_4$ | $S_7$ | −20.030 | 0.751 | 1.640 | 23.523 | 1.891 |
| 9 | QED_TYPE_1 | | $S_8$ | 5.975 | 0.730 | | | 1.777 |
| 10 | QED_TYPE_1 | $L_5$ | $S_9$ | −101.515 | 0.424 | 1.535 | 55.664 | 1.790 |
| 11 | QED_TYPE_1 | | $S_{10}$ | 34.419 | 6.040 | | | 1.854 |
| 12 | STANDARD | IR Cut-Off | | Infinity | 0.210 | 1.517 | 64.167 | 3.102 |
| 13 | STANDARD | | | Infinity | 0.500 | | | 3.130 |
| 14 | Image | | | Infinity | — | | | 3.232 |

TABLE 18

| # | k | Max Radius | A0 | A1 | A2 | A3 | A4 | A5 |
|---|---|---|---|---|---|---|---|---|
| 2 | −0.164 | 3.223 | 2.50E−01 | 8.12E−02 | 2.71E−02 | 7.56E−03 | 1.60E−03 | 2.07E−04 |
| 3 | 53.332 | 2.702 | 2.22E−01 | −9.60E−03 | 2.41E−03 | −1.18E−03 | 2.91E−05 | −6.96E−05 |
| 4 | 45.903 | 2.268 | −5.44E−03 | 1.88E−02 | −2.59E−03 | 1.22E−03 | −7.59E−05 | 8.13E−05 |
| 5 | 0.186 | 1.948 | −1.15E−01 | 1.98E−02 | −2.50E−03 | 7.16E−04 | −7.79E−05 | 1.74E−05 |
| 6 | 0.869 | 2.132 | −7.40E−02 | 2.05E−03 | 5.01E−04 | 9.64E−04 | 5.64E−05 | −2.93E−05 |
| 7 | −1.245 | 2.101 | 1.29E−02 | −1.11E−02 | 3.57E−03 | 1.04E−04 | −5.70E−05 | 2.15E−05 |
| 8 | −61.046 | 2.042 | 1.91E−03 | −7.33E−03 | 4.02E−03 | −1.04E−03 | −1.78E−04 | 4.51E−05 |
| 9 | 2.955 | 2.200 | −4.49E−02 | 3.68E−03 | −1.90E−03 | −1.26E−03 | 7.28E−04 | 2.56E−04 |
| 10 | 1130.310 | 2.180 | −3.03E−01 | 5.71E−03 | −7.06E−03 | −5.26E−04 | 6.41E−04 | 1.72E−04 |
| 11 | −793.748 | 2.244 | −3.17E−01 | −1.03E−03 | −5.39E−03 | −1.63E−05 | 3.23E−04 | 2.47E−05 |

Example 7

TABLE 19

| | |
|---|---|
| EFL | 16.142 |
| TTL | 14.963 |
| F/# | 2.612 |
| SDL/2 | 2.930 |
| BFL | 7.459 |
| TTL/EFL | 0.927 |
| BFL/TTL | 0.498 |

TABLE 19-continued

| | |
|---|---|
| $CA(S_1)/CA(S_3)$ | 1.489 |
| $T(AS$ to $S_3)/TTL$ | 0.160 |
| $SDL/CA(S_{2N})$ | 1.635 |
| $f_1$ | 8.251 |
| $f_2$ | −3.476 |
| $f_3$ | 5.637 |
| $f_4$ | −5.582 |
| $f_5$ | 5.558 |

TABLE 20

| Surface # | Surface Type | Comments | | Radius | T | Nd | Vd | D/2 |
|---|---|---|---|---|---|---|---|---|
| 1 | Stop | | stop | Infinity | −1.442 | | | 3.090 |
| 2 | STANDARD | $L_1$ | $S_1$ | 3.945 | 1.865 | 1.589 | 61.248 | 3.130 |
| 3 | STANDARD | | $S_2$ | 17.262 | 1.965 | | | 2.884 |
| 4 | QED_TYPE_1 | $L_2$ | $S_3$ | −4.663 | 0.629 | 1.636 | 23.972 | 2.101 |
| 5 | QED_TYPE_1 | | $S_4$ | 4.419 | 0.185 | | | 1.824 |
| 6 | QED_TYPE_1 | $L_3$ | $S_5$ | 2.756 | 1.192 | 1.535 | 55.664 | 1.870 |
| 7 | QED_TYPE_1 | | $S_6$ | 27.278 | 0.319 | | | 1.756 |
| 8 | QED_TYPE_1 | $L_4$ | $S_7$ | −11.519 | 0.575 | 1.535 | 55.664 | 1.748 |
| 9 | QED_TYPE_1 | | $S_8$ | 4.100 | 0.055 | | | 1.747 |
| 10 | QED_TYPE_1 | $L_5$ | $S_9$ | 3.251 | 0.718 | 1.636 | 23.972 | 1.792 |
| 11 | QED_TYPE_1 | | $S_{10}$ | 37.292 | 6.749 | | | 1.759 |
| 12 | STANDARD | IR Cut-Off | | Infinity | 0.210 | 1.517 | 64.167 | 2.863 |
| 13 | STANDARD | | | Infinity | 0.500 | | | 2.887 |
| 14 | Image | | | Infinity | — | | | 2.934 |

TABLE 21

| # | k | Max Radius | A0 | A1 | A2 | A3 | A4 | A5 |
|---|---|---|---|---|---|---|---|---|
| 4 | −6.573 | 2.16E+00 | 6.88E−02 | 2.54E−03 | −7.99E−04 | 3.80E−04 | −1.10E−05 | 1.47E−06 |
| 5 | −7.356 | 1.85E+00 | 1.42E−01 | 2.30E−02 | 3.12E−03 | 1.37E−03 | 6.79E−06 | −8.67E−07 |
| 6 | −3.503 | 1.91E+00 | 1.23E−01 | 2.61E−03 | 1.79E−03 | 1.53E−03 | 1.50E−05 | −2.00E−06 |
| 7 | 16.927 | 1.84E+00 | 8.37E−02 | −1.69E−02 | −1.54E−03 | −1.01E−04 | −1.93E−10 | 1.09E−10 |
| 8 | −52.143 | 1.75E+00 | −3.24E−02 | 4.94E−03 | −9.10E−04 | −9.67E−04 | −2.75E−06 | 3.61E−07 |
| 9 | −7.394 | 1.75E+00 | 1.79E−02 | 3.64E−03 | 3.21E−03 | −1.54E−03 | 7.37E−06 | −9.61E−07 |
| 10 | −4.914 | 1.79E+00 | 6.31E−02 | 2.69E−03 | 4.54E−03 | −4.47E−04 | 1.06E−05 | −1.40E−06 |
| 11 | −436.851 | 1.76E+00 | 3.81E−02 | 5.36E−03 | 1.79E−03 | 6.74E−04 | 4.44E−07 | −5.18E−08 |

Example 8

TABLE 22

| | |
|---|---|
| EFL | 14.955 |
| TTL | 14.056 |
| F/# | 2.690 |
| SDL/2 | 2.930 |
| BFL | 6.566 |
| TTL/EFL | 0.940 |
| BFL/TTL | 0.467 |
| $CA(S_1)/CA(S_3)$ | 1.489 |
| $T(AS$ to $S_3)/TTL$ | 0.171 |
| $SDL/CA(S_{2N})$ | 1.811 |
| f1 | 7.731 |
| f2 | −4.271 |
| f3 | 8.905 |
| f4 | 6.428 |
| f5 | −6.636 |

TABLE 23

| Surface # | Surface Type | Comments | | Radius | T | Nd | Vd | D/2 |
|---|---|---|---|---|---|---|---|---|
| 1 | Stop | | stop | Infinity | −1.179 | | | 2.780 |
| 2 | QED_TYPE_1 | $L_1$ | $S_1$ | 3.758 | 2.129 | 1.589 | 61.248 | 2.780 |
| 3 | QED_TYPE_1 | | $S_2$ | 16.982 | 1.451 | | | 2.393 |
| 4 | QED_TYPE_1 | $L_2$ | $S_3$ | −4.844 | 0.527 | 1.640 | 23.523 | 1.866 |
| 5 | QED_TYPE_1 | | $S_4$ | 6.532 | 0.152 | | | 1.689 |
| 6 | QED_TYPE_1 | $L_3$ | $S_5$ | 4.374 | 1.014 | 1.535 | 55.664 | 1.693 |
| 7 | QED_TYPE_1 | | $S_6$ | 49.355 | 0.114 | | | 1.658 |
| 8 | QED_TYPE_1 | $L_4$ | $S_7$ | 26.407 | 1.736 | 1.640 | 23.523 | 1.650 |
| 9 | QED_TYPE_1 | | $S_8$ | −4.746 | 0.095 | | | 1.632 |
| 10 | QED_TYPE_1 | $L_5$ | $S_9$ | −4.779 | 0.273 | 1.535 | 55.664 | 1.605 |
| 11 | QED_TYPE_1 | | $S_{10}$ | 14.063 | 5.856 | | | 1.618 |
| 12 | STANDARD | IR Cut-Off | | Infinity | 0.210 | 1.517 | 64.167 | 2.799 |
| 13 | STANDARD | | | Infinity | 0.500 | | | 2.828 |
| 14 | Image | | | Infinity | — | | | 2.933 |

TABLE 24

| # | k | Max Radius | A0 | A1 | A2 | A3 | A4 | A5 |
|---|---|---|---|---|---|---|---|---|
| 4 | −2.296 | 1.858 | 9.41E−02 | −1.97E−03 | 1.50E−05 | 2.73E−05 | −1.10E−05 | 1.47E−06 |
| 5 | 9.483 | 1.661 | −9.79E−03 | 3.07E−03 | 1.90E−05 | 4.84E−05 | 6.79E−06 | −8.67E−07 |
| 6 | −2.619 | 1.663 | −2.79E−02 | −1.64E−03 | −1.57E−05 | −5.52E−07 | 1.50E−05 | −2.00E−06 |
| 7 | 10.398 | 1.630 | 2.56E−04 | −6.63E−03 | −2.34E−05 | −6.37E−05 | −1.93E−10 | 1.09E−10 |
| 8 | −367.355 | 1.630 | −4.47E−02 | −1.13E−04 | 4.08E−04 | −1.35E−05 | −2.75E−06 | 3.61E−07 |
| 9 | −10.130 | 1.667 | −7.09E−02 | −1.51E−03 | 5.65E−07 | −4.95E−05 | 7.37E−06 | −9.61E−07 |
| 10 | −10.587 | 1.647 | −8.62E−02 | −2.59E−03 | 2.61E−05 | −8.81E−05 | 1.06E−05 | −1.40E−06 |
| 11 | −9.745 | 1.659 | −4.10E−02 | 9.88E−04 | 5.35E−05 | 4.08E−05 | 4.44E−07 | −5.18E−08 |

Example 9

TABLE 25

| | |
|---|---|
| EFL | 11.190 |
| TTL | 11.135 |
| F/# | 2.590 |
| SDL/2 | 2.620 |
| BFL | 4.303 |
| TTL/EFL | 0.995 |
| BFL/TTL | 0.386 |
| $CA(S_1)/CA(S_3)$ | 1.195 |
| $T(AS\ to\ S_3)/TTL$ | 0.191 |
| $SDL/CA(S_{2N})$ | 1.638 |
| $f_1$ | 4.559 |
| $f_2$ | −3.894 |
| $f_3$ | 7.111 |
| $f_4$ | −8.492 |

TABLE 26

| # | | | | R | T | Nd | Vd | CA/2 | k |
|---|---|---|---|---|---|---|---|---|---|
| 1 | Evn-asph | $L_1$ | $S_1$ | 3.252 | 2.571 | 1.534 | 55.663 | 2.16 | −0.763 |
| 2 | Evn-asph | | $S_2$ | −7.055 | 0.253 | | | 1.76 | −17.097 |
| 3 | Evn-asph | $L_2$ | $S_3$ | −10.672 | 0.444 | 1.6397 | 23.5288 | 1.60 | −75.529 |
| 4 | Evn-asph | | $S_4$ | 3.302 | 0.309 | | | 1.45 | −0.248 |
| 5 | Evn-asph | $L_3$ | $S_5$ | 10.322 | 2.569 | 1.6397 | 23.5288 | 1.47 | 15.386 |
| 6 | Evn-asph | | $S_6$ | −7.343 | 0.403 | | | 1.46 | −43.555 |
| 7 | Evn-asph | $L_4$ | $S_7$ | −4.066 | 0.282 | 1.534 | 55.663 | 1.45 | −22.400 |
| 8 | Evn-asph | | $S_8$ | −39.758 | 3.804 | | | 1.60 | −20.554 |
| 9 | Flat | | | Infinity | 0.210 | 1.5168 | 64.16733 | 2.524 | |
| 10 | Flat | | | Infinity | 0.290 | | | 2.555 | |
| 11 | Flat | | | Infinity | 0.000 | | | 2.626 | |

TABLE 27

| # | A1 | A2 | A3 | A4 | A5 | A6 | A7 |
|---|---|---|---|---|---|---|---|
| 1 | 1.6499E−03 | −1.0742E−04 | 5.7901E−06 | −8.6098E−08 | −1.7012E−06 | 1.8672E−07 | −2.7417E−08 |
| 2 | 3.0173E−03 | −1.4633E−03 | 7.0329E−05 | −1.5844E−05 | −3.5031E−06 | 8.0518E−07 | 0.0000E+00 |
| 3 | −6.8586E−03 | 5.5011E−03 | −1.6856E−03 | 2.1537E−04 | 1.2470E−05 | −1.0238E−05 | 9.8851E−07 |
| 4 | −8.1487E−03 | 5.6510E−03 | −7.1159E−04 | 1.4107E−05 | 3.5178E−04 | 1.6510E−05 | 0.0000E+00 |
| 5 | −4.9793E−03 | −4.5018E−04 | −2.6820E−04 | 3.0430E−04 | 2.0799E−04 | 1.9782E−05 | 0.0000E+00 |
| 6 | −2.4020E−03 | 1.2967E−03 | −2.1528E−04 | −1.8139E−04 | −2.3192E−05 | 6.9007E−05 | 0.0000E+00 |
| 7 | −6.5893E−02 | 1.4911E−02 | −4.1874E−03 | 8.7863E−05 | 3.9488E−05 | 7.0827E−05 | 0.0000E+00 |
| 8 | −3.4127E−02 | 2.0251E−03 | 1.8783E−03 | −1.2365E−03 | 2.2451E−04 | 3.2977E−05 | −1.1683E−05 |

Example 10

TABLE 28

| | |
|---|---|
| EFL | 7.970 |
| TTL | 7.780 |
| F/# | 2.148 |
| SDL/2 | 2.930 |
| BFL | 3.266 |
| TTL/EFL | 0.976 |
| BFL/TTL | 0.420 |

TABLE 28-continued

| | |
|---|---|
| $CA(S_1)/CA(S_3)$ | 1.076 |
| $T(AS\ to\ S_3)/TTL$ | 0.039 |
| $SDL/CA(S_{2N})$ | 1.580 |
| $f_1$ | 3.986 |
| $f_2$ | −5.312 |
| $f_3$ | −760.018 |
| $f_4$ | 32.416 |
| $f_5$ | −70.342 |

TABLE 29

| # | Type | | Comments | R | T | Nd | Vd | CA/2 | k |
|---|---|---|---|---|---|---|---|---|---|
| 1 | Evn-asph | $L_1$ | $S_1$ | 2.271 | 1.127 | 1.67 | 54.96 | 1.8 | 7.979E−07 |
| 2 | Evn-asph | | $S_2$ | 11.822 | 0.06 | | | 1.725 | 2.410 |
| 3 | Evn-asph | $L_2$ | $S_3$ | 14.756 | 0.27 | 1.64 | 23.52 | 1.7 | 13.805 |
| 4 | Evn-asph | | $S_4$ | 2.728 | 0.974 | | | 1.45 | 2.902E−03 |
| 5 | Evn-asph | $L_3$ | $S_5$ | 3.713 | 0.416 | 1.64 | 23.52 | 1.55 | −2.868 |

TABLE 29-continued

| # | Type | Comments | | R | T | Nd | Vd | CA/2 | k |
|---|------|------|------|------|------|------|------|------|------|
| 6 | Evn-asph | | $S_6$ | 3.524 | 0.764 | | | 1.5 | −8.486 |
| 7 | Evn-asph | $L_4$ | $S_7$ | −5.301 | 0.338 | 1.64 | 23.52 | 1.48 | 2.743 |
| 8 | Evn-asph | | $S_8$ | −4.321 | 0.212 | | | 1.6 | 2.578 |
| 9 | Evn-asph | $L_5$ | $S_9$ | 4.327 | 0.352 | 1.53 | 55.66 | 1.68 | −9.755 |
| 10 | Evn-asph | | $S_{10}$ | 3.771 | 2.656 | | | 1.8 | −6.534 |
| 11 | Flat | | | Infinity | 0.210 | 1.52 | 64.16 | 2.894 | |
| 12 | Flat | | | Infinity | 0.401 | | | 2.938 | |
| 13 | Flat | | | Infinity | — | | | 3.028 | |

TABLE 30

| # | A1 | A2 | A3 | A4 | A5 | A6 | A7 |
|---|------|------|------|------|------|------|------|
| 1 | 4.421E−05 | −2.009E−04 | −1.152E−04 | −6.051E−10 | | | |
| 2 | 6.027E−03 | −1.244E−03 | −5.380E−08 | | | | |
| 3 | 0.020 | 7.012E−04 | −1.081E−03 | −6.297E−08 | | | |
| 4 | 0.024 | 0.011 | 4.241E−04 | −9.114E−08 | | | |
| 5 | −0.022 | 8.939E−03 | 2.200E−03 | −1.002E−06 | | | |
| 6 | −0.012 | 6.756E−03 | −2.299E−03 | 1.314E−03 | 1.758E−03 | −1.030E−05 | |
| 7 | −0.017 | 0.053 | −0.044 | 7.968E−03 | −1.599E−03 | 6.117E−04 | 7.436E−09 |
| 8 | −0.086 | 0.159 | −0.117 | 0.041 | −9.090E−03 | 1.280E−03 | 2.793E−07 |
| 9 | −0.252 | 0.182 | −0.084 | 0.016 | −6.759E−04 | −1.940E−06 | |
| 10 | −0.175 | 0.095 | −0.040 | 8.597E−03 | −7.751E−04 | −8.160E−07 | |

Sign of Refractive Elements:

TABLE 31

| | Ex1 | Ex2 | Ex3 | Ex4 | Ex5 | Ex6 | Ex7 | Ex8 | Ex9 | Ex10 |
|---|------|------|------|------|------|------|------|------|------|------|
| $f_1$ | + | + | + | + | + | + | + | + | + | + |
| $f_2$ | − | − | − | − | − | − | − | − | − | − |
| $f_3$ | + | + | + | + | + | + | + | + | + | − |
| $f_4$ | − | + | − | − | + | + | − | + | − | + |
| f5 | X | − | − | − | − | − | + | − | X | − |

TABLE 32

| | Ex 1 | Ex 2 | Ex 3 | Ex 4 | Ex 5 | Ex 6 | Ex 7 | Ex 8 | Ex 9 | Ex 10 |
|---|------|------|------|------|------|------|------|------|------|------|
| F# | 2.735 | 2.727 | 2.819 | 2.704 | 2.671 | 2.727 | 2.612 | 2.690 | 2.590 | 2.148 |
| EFL [mm] | 13.809 | 15.001 | 10.911 | 12.166 | 12.020 | 15.000 | 16.142 | 14.955 | 11.190 | 7.970 |
| TTL [mm] | 13.612 | 14.472 | 10.585 | 11.856 | 11.216 | 14.507 | 14.963 | 14.056 | 11.135 | 7.780 |
| BFL [mm] | 4.932 | 7.617 | 5.000 | 6.382 | 6.412 | 6.750 | 7.459 | 6.566 | 4.303 | 3.266 |
| TTL/EFL | 0.986 | 0.965 | 0.970 | 0.975 | 0.933 | 0.967 | 0.927 | 0.940 | 0.995 | 0.976 |
| BFL/TTL | 0.362 | 0.526 | 0.472 | 0.538 | 0.572 | 0.465 | 0.498 | 0.467 | 0.386 | 0.420 |
| SDL [mm] | 5.860 | 5.860 | 5.240 | 5.240 | 5.240 | 5.860 | 5.860 | 5.860 | 5.240 | 5.860 |
| CA($S_1$)/CA($S_3$) | 1.310 | 1.408 | 1.212 | 1.277 | 1.388 | 1.361 | 1.489 | 1.489 | 1.195 | 1.076 |
| T(AS to $S_3$)/TTL | 0.204 | 0.157 | 0.113 | 0.129 | 0.138 | 0.103 | 0.160 | 0.171 | 0.191 | 0.039 |
| SDL/CA($S_{2N}$) | 1.503 | 1.577 | 1.678 | 1.685 | 1.692 | 1.581 | 1.635 | 1.811 | 1.638 | 1.580 |
| $f_1$ [mm] 0.587 μm | 5.594 | 6.359 | 4.519 | 5.426 | 4.681 | 6.186 | 8.251 | 7.731 | 4.559 | 3.986 |
| $f_2$ [mm] 0.587 μm | −4.823 | −4.495 | −3.153 | −2.822 | −4.152 | −4.313 | −4.271 | 3.894 | −5.312 | |
| $f_3$ [mm] 0.587 μm | 9.088 | 48.439 | 3.343 | 3.047 | 34.206 | 4.578 | 5.637 | 8.905 | 7.111 | −760.018 |
| $f_4$ [mm] 0.587 μm | −10.440 | 9.909 | −5.268 | −7.208 | 11.682 | −7.114 | −5.582 | 6.428 | −8.492 | 32.416 |
| $f_5$ [mm] 0.587 μm | — | −20.537 | −35.623 | −27.026 | −12.516 | −48.010 | 5.558 | −6.636 | — | −70.342 |
| $f_1$/EFL | 0.405 | 0.423 | 0.414 | 0.445 | 0.389 | 0.412 | 0.511 | 0.517 | 0.407 | 0.500 |
| $|f_2/f_1|$ | 0.862 | 0.706 | 0.697 | 0.520 | 0.886 | 0.697 | 0.421 | 0.552 | 0.854 | 1.332 |
| TTL/Min_Gap$_1$ | 61.315 | 28.657 | 62.633 | 118.560 | 320.457 | 70.422 | 20.753 | 23.905 | 70.924 | 222.286 |
| TTL/Min_Gap$_2$ | 56.717 | 482.400 | 23.627 | 77.490 | 303.135 | 25.722 | 146.696 | 156.178 | 218.333 | 17.642 |
| TTL/Min_Gap$_3$ | 112.496 | 120.600 | 126.012 | 263.467 | 303.135 | 146.535 | 415.639 | 265.208 | 140.949 | 176.818 |
| TTL/Min_Gap$_4$ | — | 336.558 | 286.081 | 370.500 | 320.457 | 84.343 | 467.594 | 281.120 | — | 58.939 |
| TTL/OA_Gap$_1$ | 31.878 | 15.168 | 27.422 | 29.202 | 62.306 | 26.915 | 7.615 | 9.687 | 44.059 | 129.667 |
| TTL/OA_Gap$_2$ | 19.614 | 29.299 | 12.265 | 35.711 | 20.465 | 11.495 | 80.881 | 92.473 | 36.043 | 7.987 |
| TTL/OA_Gap$_3$ | 24.092 | 69.772 | 86.762 | 169.37 | 193.362 | 77.578 | 46.906 | 123.298 | 27.608 | 10.188 |
| TTL/OA_Gap$_4$ | — | 55.151 | 23.264 | 99.630 | 215.673 | 19.873 | 272.055 | 147.958 | — | 36.641 |
| STD$_1$ | 0.009 | 0.001 | 0.020 | 0.039 | 0.021 | 0.018 | 0.067 | 0.059 | 0.011 | 0.012 |
| STD$_2$ | 0.043 | 0.077 | 0.042 | 0.017 | 0.105 | 0.036 | 0.027 | 0.007 | 0.047 | 0.065 |

TABLE 32-continued

|  | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| $STD_3$ | 0.054 | 0.027 | 0.044 | 0.019 | 0.018 | 0.040 | 0.044 | 0.005 | 0.055 | 0.122 |
| $STD_4$ | — | 0.032 | 0.080 | 0.017 | 0.001 | 0.069 | 0.020 | 0.002 | — | 0.021 |

The following list and Table 33 summarize the design characteristics and parameters as they appear in the examples listed above. These characteristics helps to achieve the goal of a compact folded lens with large lens assembly aperture:

"AA": $AA_1 \equiv BFL/TTL > 0.35$, $AA_2 \equiv BFL/TTL > 0.4$, $AA_3 \equiv BFL/TTL > 0.5$;

"BB": $BB_1 \equiv CA(S_1)/CA(S_3) > 1.2$, $BB_2 \equiv CA(S_1)/CA(S_3) > 1.3$, $BB_3 \equiv CA(S_1)/CA(S_3) > 1.4$;

"CC": $CC_1 \equiv T(AS$ to $S_3)/TTL > 0.1$, $CC_2 \equiv T(AS$ to $S_3)/TTL > 0.135$, $CC_3 \equiv T(AS$ to $S_3)/TTL > 0.15$;

"DD": At least two gaps that comply with $DD_1 \equiv STD < 0.020$, $DD_2 \equiv STD < 0.015$, $DD_3 \equiv STD < 0.010$;

"EE": At least 3 gaps that comply with $EE_1 \equiv STD < 0.035$, $EE_2 \equiv STD < 0.025$, $EE_3 \equiv STD < 0.015$;

"FF": At least 4 gaps that comply with $FF_1 \equiv STD < 0.050$, $FF_2 \equiv STD < 0.035$, $FF_3 \equiv STD < 0.025$;

"GG": $GG_1 \equiv SDL/CA(S_2N) > 1.5$, $GG_2 \equiv SDL/CA(S_2N) > 1.55$, $GG_3 \equiv SDL/CA(S_{2N}) > 1.6$;

"HH": a power sign sequence;

"II": At least 1 gap that complies with $II_1 \equiv STD < 0.01$ and OA_Gap/TTL < 1/80, $II_2 \equiv STD < 0.015$ and OA_Gap/TTL < 1/65;

"JJ": $JJ_1$: Abbe number sequence of lens elements $L_1$, $L_2$ and La can be respectively larger than 50, smaller than 30 and larger than 50;

$JJ_2$: Abbe number sequence of lens elements $L_1$, $L_2$ and $L_3$ can be respectively larger than 50, smaller than 30 and smaller than 30;

"KK": $KK_1 \equiv |f_2/f_1| > 0.4$ and Abbe number sequence of lens elements $L_1$, $L_2$ and $L_3$ can be respectively larger than 50, smaller than 30 and smaller than 30; $KK_2 \equiv |f_2/f_1| < 0.5$ and Abbe number sequence of lens elements $L_1$, $L_2$ and $L_3$ can be respectively larger than 50, smaller than 30 and larger than 50; and "LL": $LL_1 \equiv f_1/EFL < 0.55$, $LL_2 \equiv f_1/EFL < 0.45$;

"MM": $MM_1 \equiv |f_2/f_1| < 0.9$, $MM_2 \equiv |f_2/f_1| < 0.5$; and

"NN": $NN_1 \equiv TTL/EFL < 0.99$, $NN_2 \equiv TTL/EFL < 0.97$, $NN_3 \equiv TTL/EFL < 0.95$.

"OO": At least two gaps that comply with $OO_1 \equiv STD > 0.020$, $OO_2 \equiv STD > 0.03$, $OO_3 \equiv STD > 0.040$;

"PP": At least 3 gaps that comply with $PP_1 \equiv STD > 0.015$, $PP_2 \equiv STD > 0.02$, $PP_3 \equiv STD > 0.03$;

"QQ": At least 4 gaps that comply with $QQ_1 \equiv STD > 0.015$, $QQ_2 \equiv STD > 0.02$, $QQ_3 \equiv STD > 0.03$;

"RR": At least 3 OA_Gaps that comply with $RR_1 \equiv TTL/Min\_Gap > 50$, $RR_2 \equiv TTL/Min\_Gap > 60$, $RR_3 \equiv TTL/Min\_Gap > 100$.

TABLE 33

| Example | EX1 | EX2 | EX3 | EX4 | EX5 | EX6 | EX7 | EX8 | EX9 | EX10 |
|---|---|---|---|---|---|---|---|---|---|---|
| $AA_1$ | ✓ | ✓ | ✓ | ✓ | ✓ | ✓ | ✓ | ✓ | ✓ | ✓ |
| $AA_2$ | X | ✓ | ✓ | ✓ | ✓ | ✓ | ✓ | ✓ | X | ✓ |
| $AA_3$ | X | ✓ | X | ✓ | ✓ | X | X | X | X | X |
| $BB_1$ | ✓ | ✓ | ✓ | ✓ | ✓ | ✓ | ✓ | ✓ | X | X |
| $BB_2$ | ✓ | ✓ | X | X | ✓ | ✓ | ✓ | ✓ | X | X |
| $BB_3$ | X | ✓ | X | X | X | X | ✓ | ✓ | X | X |
| $CC_1$ | ✓ | ✓ | ✓ | ✓ | ✓ | ✓ | ✓ | ✓ | ✓ | X |
| $CC_2$ | ✓ | ✓ | X | X | ✓ | ✓ | ✓ | ✓ | ✓ | X |
| $CC_3$ | ✓ | ✓ | X | X | X | X | ✓ | ✓ | ✓ | X |
| $DD_1$ | X | X | X | ✓ | ✓ | X | X | ✓ | X | X |
| $DD_2$ | X | X | X | X | X | X | X | ✓ | X | X |
| $DD_3$ | X | X | X | X | X | X | X | ✓ | X | X |
| $EE_1$ | X | ✓ | X | ✓ | ✓ | X | X | ✓ | X | X |
| $EE_2$ | X | X | X | ✓ | ✓ | X | X | ✓ | X | X |
| $EE_3$ | X | X | X | X | X | X | X | ✓ | X | X |
| $FF_1$ | X | X | X | X | X | X | X | X | X | X |
| $FF_2$ | X | X | X | X | X | X | X | X | X | X |
| $FF_3$ | X | X | X | X | X | X | X | X | X | X |
| $GG_1$ | ✓ | ✓ | ✓ | ✓ | ✓ | ✓ | ✓ | ✓ | ✓ | ✓ |
| $GG_2$ | X | ✓ | ✓ | ✓ | ✓ | ✓ | ✓ | ✓ | ✓ | ✓ |
| $GG_3$ | X | X | ✓ | ✓ | ✓ | X | ✓ | ✓ | ✓ | X |
| HH | PNPN | PNPPN | PNPNN | PNPNN | PNPPN | PNPNN | PNPNP | PNPPN | PNPN | PNNPN |
| $II_1$ | X | X | X | X | ✓ | X | X | ✓ | X | X |
| $II_2$ | X | X | X | X | ✓ | X | X | ✓ | X | ✓ |
| $JJ_1$ | X | X | X | X | X | X | ✓ | ✓ | X | X |
| $JJ_2$ | ✓ | ✓ | ✓ | ✓ | ✓ | ✓ | X | X | ✓ | ✓ |
| $KK_1$ | ✓ | ✓ | ✓ | ✓ | X | ✓ | X | X | ✓ | ✓ |
| $KK_2$ | X | X | X | X | X | X | ✓ | ✓ | X | X |
| $LL_1$ | ✓ | ✓ | ✓ | ✓ | ✓ | ✓ | ✓ | ✓ | ✓ | ✓ |
| $LL_2$ | ✓ | ✓ | ✓ | ✓ | ✓ | ✓ | ✓ | X | X | ✓ | X |
| $MM_1$ | ✓ | ✓ | ✓ | ✓ | ✓ | ✓ | ✓ | ✓ | ✓ | ✓ |
| $MM_2$ | X | X | X | ✓ | X | X | ✓ | X | X | X |
| $NN_1$ | ✓ | ✓ | ✓ | ✓ | ✓ | ✓ | ✓ | ✓ | ✓ | ✓ |
| $NN_2$ | X | ✓ | X | X | ✓ | ✓ | ✓ | ✓ | X | X |
| $NN_3$ | X | X | X | X | ✓ | X | ✓ | ✓ | X | X |
| $OO_1$ | ✓ | ✓ | ✓ | X | ✓ | ✓ | ✓ | X | ✓ | ✓ |
| $OO_2$ | ✓ | ✓ | ✓ | X | X | ✓ | ✓ | X | ✓ | ✓ |

TABLE 33-continued

| Example | EX1 | EX2 | EX3 | EX4 | EX5 | EX6 | EX7 | EX8 | EX9 | EX10 |
|---|---|---|---|---|---|---|---|---|---|---|
| $OO_3$ | ✓ | X | ✓ | X | X | ✓ | ✓ | X | ✓ | ✓ |
| $PP_1$ | X | ✓ | ✓ | ✓ | ✓ | ✓ | ✓ | X | X | ✓ |
| $PP_2$ | X | ✓ | ✓ | X | X | ✓ | ✓ | X | X | ✓ |
| $PP_3$ | X | ✓ | ✓ | X | X | ✓ | X | X | X | X |
| $QQ_1$ | X | ✓ | ✓ | ✓ | ✓ | ✓ | ✓ | X | X | X |
| $QQ_2$ | X | X | ✓ | X | X | X | ✓ | X | X | X |
| $QQ_3$ | X | X | ✓ | X | X | X | X | X | X | X |
| $RR_1$ | ✓ | ✓ | ✓ | ✓ | ✓ | ✓ | ✓ | ✓ | ✓ | ✓ |
| $RR_2$ | X | ✓ | ✓ | ✓ | ✓ | ✓ | ✓ | ✓ | ✓ | X |
| $RR_3$ | X | ✓ | ✓ | ✓ | ✓ | X | ✓ | ✓ | X | X |

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A lens assembly, comprising:

N≥4 lens elements; and an image sensor having an image sensor diagonal length SDL, wherein with a first lens element $L_1$ faces an object and a last lens element $L_N$ faces the image sensor, wherein the lens assembly has an effective focal length (EFL), a total track length (TTL) defined as the distance from a first surface $S_1$ of $L_1$ to the image sensor and a back focal length (BFL) defined as the distance from a last surface $S_{2N}$ of $L_N$ to the image sensor, wherein a ratio between SDL and a clear aperture $CA(S_{2N})$ of $S_{2N}$ fulfills $SDL/CA(S_{2N})>1.5$, wherein the lens assembly has a f number f/#<3, wherein a ratio BFL/TTL>0.35, and wherein the lens assembly is included in a folded camera.

2. The lens assembly of claim 1, wherein N=4, 5.

3. The lens assembly of claim 1, wherein f/#<2.75.

4. The lens assembly of claim 1, wherein f/#<2.6.

5. The lens assembly of claim 1, wherein f/# is in a range of 2.148 to 2.819.

6. The lens assembly of claim 1, wherein $SDL/CA(S_{2N})$ >1.6.

7. The lens assembly of claim 1, wherein $SDL/CA(S_{2N})$ >1.8.

8. The lens assembly of claim 1, wherein the first surface $S_1$ of $L_1$ has a clear aperture $CA(S_1)$, wherein a first surface $S_3$ of a second lens element $L_2$ has a clear aperture $CA(S_3)$, and wherein $CA(S_1)/CA(S_3)>1.076$.

9. The lens assembly of claim 1, wherein $L_1$ has positive refractive power and wherein a second lens element $L_2$ has negative refractive power.

10. The lens assembly of claim 9, wherein a third lens element $L_3$ has positive refractive power.

11. The lens assembly of claim 1, wherein SDL/EFL>0.4.

12. The lens assembly of claim 1, wherein SDL/EFL is in the range of 0.389 to 0.74.

13. The lens assembly of claim 1, wherein the lens assembly has a 35 mm equivalent focal length calculated by (43.3 mm×EFL)/SDL, and wherein the 35 mm equivalent focal length is in the range of 90.2 mm to 119.3 mm.

14. The lens assembly of claim 13, wherein the 35 mm equivalent focal length is in the range of 92.5 mm to 110.8 mm.

15. The lens assembly of claim 1, wherein $L_1$ has a focal length f1, and wherein a ratio f1/EFL<0.6.

16. The lens assembly of claim 1, wherein $L_1$ has a focal length f1, wherein a second lens element $L_2$ has a focal length f2, and wherein a magnitude of a ratio |f2/f1| is in the range of 0.421 to 0.886.

17. The lens assembly of claim 16, wherein |f2/f1| is in the range of 0.697 to 0.862.

18. The lens assembly of claim 1, wherein BFL/TTL>0.5.

19. The lens assembly of claim 1, wherein a ratio TTL/EFL<1.

20. The lens assembly of claim 1, wherein $L_1$ has a first lens element thickness T1, and wherein a ratio of T1/TTL>0.1.

21. The lens assembly of claim 1, wherein the lens assembly is included in a mobile phone.

*     *     *     *     *